(12) United States Patent
Tsutsui et al.

(10) Patent No.: US 7,435,479 B2
(45) Date of Patent: Oct. 14, 2008

(54) LIGHT-CONTROLLING ELEMENT AND METHOD FOR MANUFACTURING THE SAME

(75) Inventors: Hiroaki Tsutsui, Minamiashigara (JP); Masahiro Moriyama, Minamiashigara (JP); Akinori Komura, Ashigarakami-gun (JP); Ryojiro Akashi, Minamiashigara (JP)

(73) Assignee: Fuji Xerox Co., Ltd., Tokyo (JP)

( * ) Notice: Subject to any disclaimer, the term of this patent is extended or adjusted under 35 U.S.C. 154(b) by 621 days.

(21) Appl. No.: 10/866,836

(22) Filed: Jun. 15, 2004

(65) Prior Publication Data

US 2005/0104049 A1    May 19, 2005

(30) Foreign Application Priority Data

Nov. 19, 2003   (JP)   ............... 2003-389267

(51) Int. Cl.
*B32B 27/24* (2006.01)
*G02B 5/22* (2006.01)
*G02B 5/24* (2006.01)

(52) U.S. Cl. .................... 428/411.1; 428/523; 428/913; 359/886; 359/892

(58) Field of Classification Search ............... 428/411.1, 428/523, 913; 359/886, 892
See application file for complete search history.

(56) References Cited

FOREIGN PATENT DOCUMENTS

| JP | A-61-149926 | 7/1986 |
|---|---|---|
| JP | A-61-151621 | 7/1986 |
| JP | A-61-151625 | 7/1986 |
| JP | A-62-925 | 1/1987 |
| JP | A-62-927 | 1/1987 |
| JP | A-4-134325 | 5/1992 |
| JP | A-4-274480 | 9/1992 |
| JP | A-5-188354 | 7/1993 |
| JP | B2-7-95172 | 10/1995 |
| JP | A-9-160081 | 6/1997 |
| JP | A-11-228850 | 8/1999 |
| JP | A-11-236559 | 8/1999 |
| JP | A-2000-231127 | 8/2000 |
| JP | A-2001-350163 | 12/2001 |
| JP | A-2002-105327 | 4/2002 |
| JP | A-2002-105344 | 4/2002 |

OTHER PUBLICATIONS

Machine assistent translation of JP 2001-350163, Dec. 2001.*
English language translation of JP 2001-350163, Dec. 2001.*

* cited by examiner

*Primary Examiner*—Ramsey Zacharia
(74) *Attorney, Agent, or Firm*—Oliff & Berridge, PLC (57) ABSTRACT

The present invention relates to a light-controlling element comprising a polymer gel composition layer containing: a holding member; liquid held by the holding member; and a stimulus-responsive polymer gel which is held by the holding member and which changes in volume by absorbing or discharging the liquid due to an external stimulus, wherein the stimulus-responsive polymer gel is arranged in a single layer in the holding member, and also relates to a method for manufacturing the element. The polymer gel composition layer can be provided with a substrate on one side or both sides thereof, and further can be provided with a stimulus providing member.

21 Claims, 2 Drawing Sheets

LIGHT-CONTROLLING ELEMENT AND METHOD FOR MANUFACTURING THE SAME

CROSS-REFERENCE TO RELATED APPLICATION

This application claims priority under 35 USC 119 from Japanese Patent Application No. 2003-389267, the disclosure of which is incorporated by reference herein.

BACKGROUND OF THE INVENTION

1. Field of the Invention

The present invention relates to a light-controlling element and a method for manufacturing the same.

2. Description of the Related Art

It is conventionally known to perform light control and color development by controlling the amount of light transmission or light scattering properties by using a polymer gel material (a stimulus-responsive polymer gel) which undergoes a reversible volume change (swelling/shrinking) due to a pH change, an ion intensity change, absorption or discharge of chemical material, a solvent composition change, or the provision of a stimulus such as heat, light, or electricity.

As examples of the techniques to control the amount of light transmission or light scattering properties without using any dye, Japanese Patent Application Laid-open (JP-A) Nos. 61-151621 and 62-925 disclose elements which carries out display by controlling light scattering properties by changing the difference in refractive index between a polymer gel which absorbs or discharges liquid due to a temperature change and a solvent, by the swelling and shrinking of the polymer gel.

In addition, JP-A No. 4-134325 suggests an element which carries out display by a change in the light scattering properties of a polymer gel which absorbs or discharges liquid due to an electrical stimulus. JP-A No. 7-95172 proposes an element which carries out display by changing the light scattering properties of a polymer gel through a pH change due to the ion doping and dedoping of a conductive polymer contained in the polymer gel. JP-A No. 5-188354 proposes an element which conducts a whitened or transparent display by shielding, reflecting, or scattering light or controlling a light transmitting condition by the swelling and shrinking of a polymer gel which absorbs or discharges liquid due to the action of an electric field.

On the other hand, as an example of the technique to control color developing conditions by using a dye, JP-A No. 61-149926 proposes a light-controlling element comprising a composition containing a polymer gel which absorbs or discharges liquid due to the action of an electric field and a coloring liquid containing a pigment dispersed in the liquid. This is a technique to carry out display by moving a coloring liquid by a change in the shape of a polymer gel. JP-A Nos. 61-151625 and 62-927 propose elements which make use of a colored polymer gel that decreases its optical density when swollen and that is colored when shrunk. JP-A No. 4-274480 proposes an element that carries out display by using a polymer gel bonded with a dye and changing the volume of the polymer gel, thereby changing its optical density. Furthermore, JP-A No. 9-160081 suggests an element which makes use of a change in the shape of a polymer gel adsorbed onto the surface of pigment particulates or coloring particulates so as to produce a nearly white display when the polymer gel is swollen and to produce a display of the colors of the pigment particulates or the coloring particulates when the polymer gel is shrunk, thereby changing the hue due to a volume change in the polymer gel.

The present inventors have suggested, in JP-A No. 11-236559, a novel color developing material as a coloring material with excellent contrast. This color developing material is a composition comprising a polymer gel which swells and shrinks by absorbing or discharging liquid when a stimulus is given, and which contains a pigment having a concentration not less than the concentration of saturated absorption. When the polymer gel is shrunk, the local aggregation of the pigment decreases the efficiency of light absorption, making the composition light transmissive. On the other hand, when the polymer gel is swollen, the pigment disperses into the composition to increase the efficiency of light absorption, changing the composition to a colored state.

The present inventors have also suggested, in JP-A No. 2000-231127, a composition and light-controlling material comprising a polymer gel which swells and shrinks by absorbing or discharging liquid when a stimulus is given, and which contains a light scattering member having a concentration not less than the concentration of saturated scattering. When the polymer gel is shrunk, local aggregation of the light-scattering material decreases the efficiency of light scattering, making the composition light transmissive. On the other hand, when the polymer gel is swollen, the light scattering material disperses into the composition to increase the efficiency of light scattering, changing the composition to a whitened state.

The present inventors have further suggested a light-controlling element in which a stimulus-responsive polymer gel is fixed on a substrate in JP-A No. 2001-350163. In this structure, a stimulus-responsive polymer gel is fixed on the substrate in a single particle layer so as to have a highly occupied area, and a counter substrate is provided thereon to seal liquid which is absorbed or discharged by the stimulus-responsive polymer gel between the substrates. The result is a light-controlling element which is excellent in color developing properties or light scattering properties when the gel is swollen, and which is also excellent in contrast ratio.

The present inventors have further suggested a polymer gel composition containing a stimulus-responsive polymer gel dispersed into a separating member, and a light-controlling element using the composition in JP-A No. 11-228850. Fixing the stimulus-responsive gel in the separating member can avoid the occurrence of aggregation of the gel due to its swelling or shrinking, thereby providing a light-controlling element excellent in repeating properties. JP-A No. 2002-105344 suggests a light-controlling element with excellent transparency due to reduction in the difference in refraction index between the separating member and the stimulus-responsive polymer gel. JP-A No. 2002-105327 suggests a light-controlling element with excellent transparency due to containment of the liquid that is absorbed or discharged by the stimulus-responsive polymer gel in a holding member for fixation of the stimulus-responsive polymer gel.

However, in a case where an element having a structure in which a counter substrate is provided on a substrate on which a stimulus-responsive polymer gel is fixed and in which a liquid which is absorbed or discharged by the stimulus-responsive polymer gel is sealed between the substrates is used in a light controlling glass or display, there has been a problem in that the liquid inside is scattered around if the element is broken. Moreover, when the area of the element is increased, there are cases where the substrates are deformed by the weight of the liquid, causing bubbles to be generated inside, and thus, increasing the area of the element has been difficult.

The use of a light-controlling element provided with a stimulus-responsive polymer gel dispersed into a separating member or a holding member can prevent the inside liquid from scattering when the element is broken, and can also prevent the deformation of the element when the area of the element is increased. However, homogeneous dispersion of the stimulus-responsive polymer gel requires that a precursor solution of the separating member or the holding member have high viscosity, thereby greatly limiting usable solutions. In addition, the stimulus-responsive polymer gel being dispersed in the separating member or the holding member causes unevenness in the optical density of the cell due to unevenness in the thickness of the element. Moreover, in this structure, since the stimulus-responsive polymer gel is accumulated in multiple layers, the accumulation of the gel has sometimes caused a decrease in transmittance when the element decolored.

SUMMARY OF THE INVENTION

The present invention provides a light-controlling element which makes use of a stimulus-responsive polymer gel swelling and shrinking repeatedly; which never deforms with increasing area; which has excellent light-controlling properties with small density unevenness; and which has high safety, and a method for manufacturing the element.

The present invention includes:
(1) A light-controlling element comprising a polymer gel composition layer containing: a holding member; liquid held by the holding member; and a stimulus-responsive polymer gel which is held by the holding member and which changes in volume by absorbing or discharging the liquid due to an external stimulus, wherein the stimulus-responsive polymer gel is arranged in a single layer in the holding member.
(2) A method for manufacturing a light-controlling element at least comprising: arranging a stimulus-responsive polymer gel on a surface of a temporary support; forming a holding member by applying a holding member precursor onto the surface of the temporary support on which the stimulus-responsive polymer gel has been arranged, and curing the holding member precursor; and removing the temporary support.
(3) A method for manufacturing a light-controlling element at least comprising: arranging a stimulus-responsive polymer gel on a surface of a substrate; and forming a holding member by applying a holding member precursor onto the surface of the substrate on which the stimulus-responsive polymer gel has been arranged, and curing the holding member precursor.
(4) A method for manufacturing a light-controlling element, at least comprising: fixing a stimulus-responsive polymer gel onto a surface of a substrate; preparing a cell by disposing the substrate and another substrate so as to face each other with a specific space therebetween in such a manner that the surface of the substrate having the stimulus-responsive polymer gel fixed thereon faces the other substrate, and sealing a periphery of the substrates; injecting a holding member precursor into the cell; and forming a holding member by curing the holding member precursor.
(5) A method for manufacturing a light-controlling element, at least comprising: fixing a stimulus-responsive polymer gel onto a surface of a substrate; applying a holding member precursor onto at least one surface of the substrate; disposing a pair of substrates so as to face each other in such a manner that the surface of the substrate on which the stimulus-responsive polymer gel has been fixed and the another surface of the substrate on which the holding member precursor has been applied face inward; forming a holding member by curing the holding member precursor; and sealing a periphery of the substrates.

BRIEF DESCRIPTION OF THE DRAWINGS

Preferred embodiment(s) of the present invention will be described in detail based on the following figures, wherein.

DETAILED DESCRIPTION OF THE INVENTION

The light-controlling element and the method for manufacturing the same of the present invention will be described in detail as follows.

-Light-Controlling Element-

The light-controlling element of the invention will be described with reference to the drawings.

Figure 1:
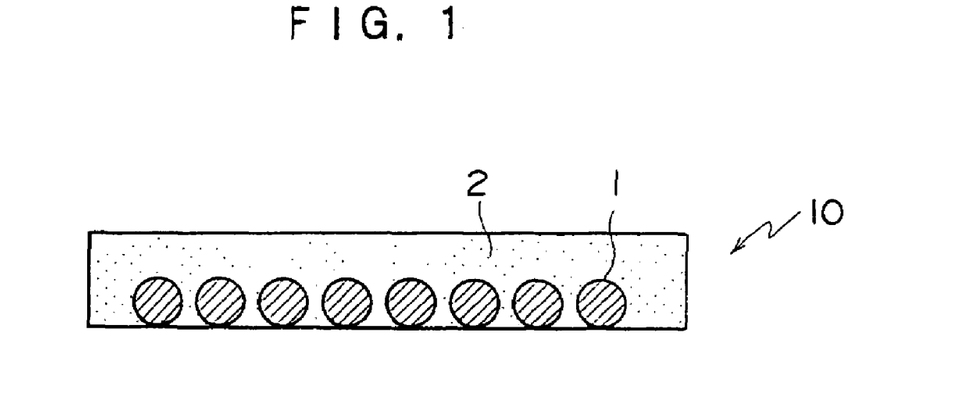
FIG. 1 is a simplified structural view showing a cross section of the light-controlling element of a first embodiment.

FIG. 1 is a simplified structure showing an example of the light-controlling element of the invention. A light-controlling element 10 comprises a polymer gel composition layer containing a holding member 2, an unillustrated liquid held by the holding member 2, and a stimulus-responsive polymer gel 1 which is held by the holding member 2 and which changes in volume by absorbing or discharging the liquid by an external stimulus. The stimulus-responsive polymer gel 1 is arranged in a single layer in the holding member 2.

In the invention, arranging a stimulus-responsive polymer gel in a single layer indicates that the stimulus-responsive polymer gel swollen with absorbed liquid are arranged in a single row in a cross section of the light-controlling element as shown in FIG. 1.

Figure 2:
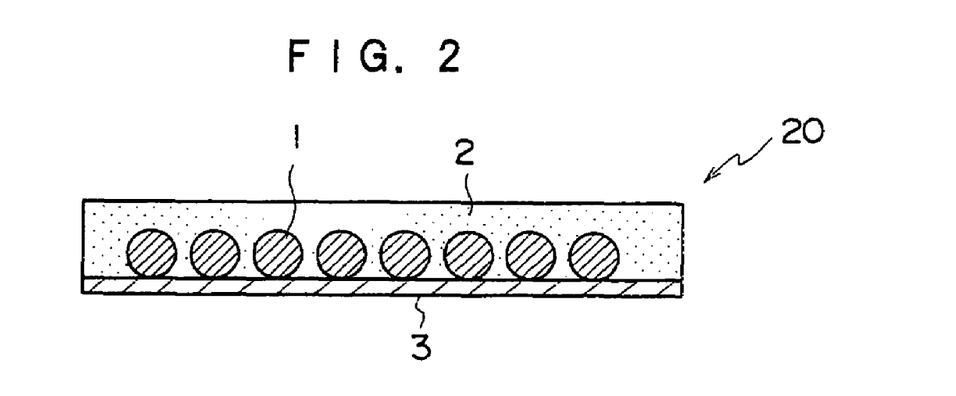
FIG. 2 is a simplified structural view showing a cross section of the light-controlling element of a second embodiment.

FIG. 2 is a simplified structural view showing another example of the light-controlling element of the invention. A light-controlling element 20 comprises a substrate 3, and a polymer gel composition layer which is laid on the surface of the substrate 3 and which contains a holding member 2, an unillustrated liquid held by the holding member 2, and a stimulus-responsive polymer gel 1 which changes in volume by absorbing or discharging the liquid by an external stimulus. The stimulus-responsive polymer gel 1 is distributed in a single layer.

In the light-controlling element 20, the stimulus-responsive polymer gel 1 can be disposed in contact with the surface of the substrate 3 as shown in FIG. 2. When the stimulus-responsive polymer gel 1 are disposed in contact with the surface of the substrate 3, a change in the volume of the stimulus-responsive polymer gel 1 changes the area to absorb or scatter light, and thereby changing the light permeation or light scattering properties in the light-controlling element. Furthermore, the single-layered arrangement of the stimulus-responsive polymer gel 1 can prevent the accumulation or aggregation of the stimulus-responsive polymer gel 1, thereby drawing the maximum changes in optical properties according to the volume change of the stimulus-responsive polymer gel 1.

When disposed in contact with the surface of the substrate 3, the stimulus-responsive polymer gel 1 may be fixed on the surface of the substrate 3. Consequently, when the particles of the stimulus-responsive polymer gel 1 are accumulated in multi layers in the manufacturing process, the stimulus-responsive polymer gel not fixed on the substrate can be easily washed out with a liquid or the like, thereby providing a method for manufacturing a highly reliable light-controlling element.

Figure 3:
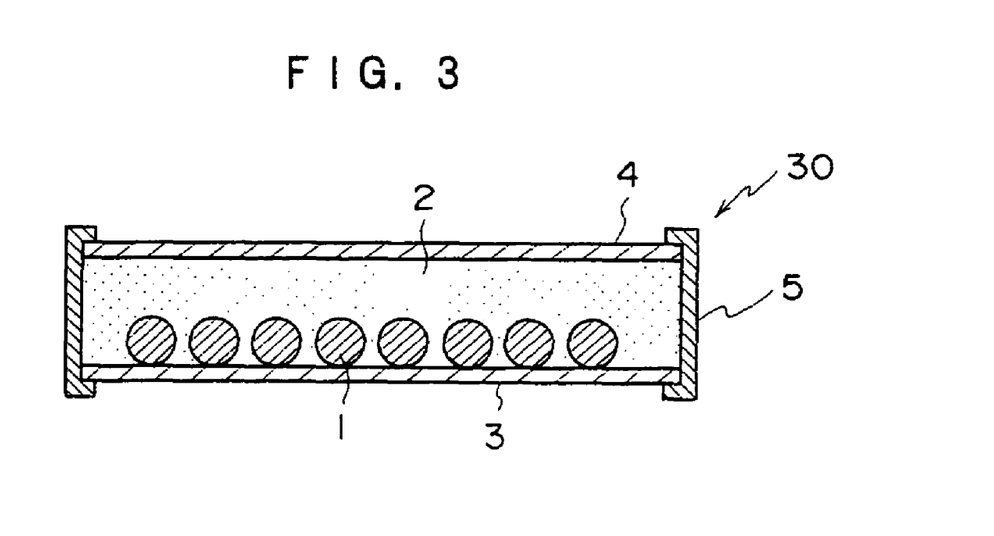
FIG. 3 is a simplified structural view showing a cross section of the light-controlling element of a third embodiment.

FIG. 3 is a simplified structural view showing another example of the light-controlling element of the invention. A light-controlling element 30 is provided with a pair of substrates 3 and 4, at least one of which is transparent, and a polymer gel composition layer which is sandwiched between the substrates 3 and 4 and which contains a holding member 2, an unillustrated liquid held by the holding member 2, and a stimulus-responsive polymer gel 1 that changes in volume by absorbing or discharging the liquid by an external stimulus. The stimulus-responsive polymer gel 1 is arranged in a single layer. The periphery of the substrates 3 and 4 is sealed with a sealing member 5 such as an adhesive, an ultraviolet curable resin, or a thermosetting resin to avoid liquid evaporation.

In the light-controlling element 30, the stimulus-responsive polymer gel 1 may be disposed in contact with the surface of the substrate 3 or 4. In that case, the stimulus-responsive polymer gel 1 may be fixed on the surface of the substrate 3 or 4. The effect of the stimulus-responsive polymer gel 1 being fixed on the surface of the substrate 3 or 4 has been described above.

Figure 4:
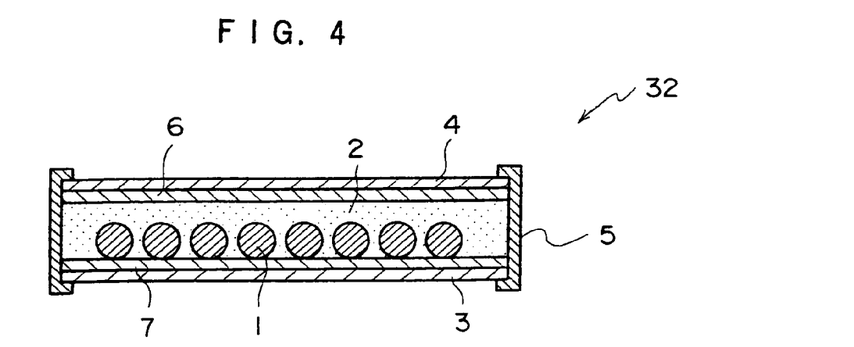
FIG. 4 is a simplified structural view showing a cross section of the light-controlling element provided with a stimulus providing member.

FIG. 4 is a simplified structural view showing a light-controlling element 32 formed by providing stimulus providing members 6 and 7 to the light-controlling element shown in FIG. 3. In FIG. 4, the stimulus providing members 6 and 7 are provided on the inner sides of the substrates 3 and 4; however, they can be formed on their outer sides. The stimulus providing members 6 and 7 are not essential components; however, they are preferably provided on at least one side of the light-controlling element, and on both sides if necessary. The stimulus-responsive polymer gel is preferably fixed on the surface of the substrate that is provided with a stimulus providing member. This makes it possible to artificially control the volume change in the stimulus-responsive polymer gel so as to arbitrarily change its light-controlling properties.

Figure 5A:
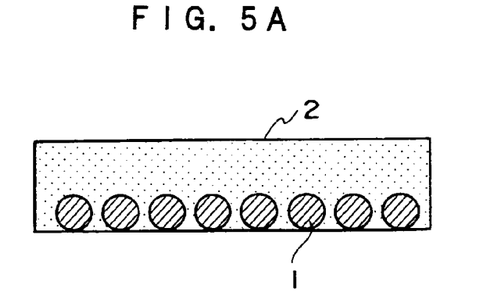
FIG. 5A is a view to describe actions of the light-controlling element of the present invention, and to show the stimulus-responsive polymer gel in a swollen state.
Figure 5B:
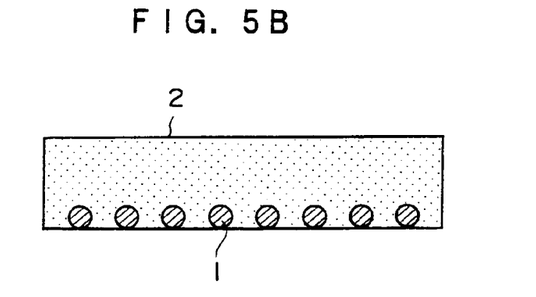
FIG. 5B is a view to describe actions of the light-controlling element of the present invention, and to show the stimulus-responsive polymer gel in a shrunk state.

Actions of the light-controlling element of the invention will be described with FIGS. 5A and 5B. FIGS. 5A and 5B are enlarged cross sectional views of the main part of the light-controlling element of the invention, and the reference symbols in these drawings are identical with those in FIG. 1. In the light-controlling element of the invention, the unillustrated liquid contained in the stimulus-responsive polymer gel 1 can be absorbed or discharged when a stimulus is given so as to swell the stimulus-responsive polymer gel 1 as shown in FIG. 5A or to shrink it as shown in FIG. 5B, thereby causing a volume change. As a result, scattering, absorption, or the like change the permeation and other properties of the light-controlling element.

In that case, there are two possible cases: a case where the liquid released outside the stimulus-responsive polymer gel 1 is present between the stimulus-responsive polymer gel 1 and the holding member 2, and the other case where the liquid released outside the stimulus-responsive polymer gel 1 soaks into the holding member 2, thereby bringing the stimulus-responsive polymer gel 1 and the holding member 2 into an intimate contact. It is considered that the former condition makes a shift to the latter condition with time.

In the light-controlling element of the invention, the single-layered arrangement of the stimulus-responsive polymer gel makes it harder to cause density unevenness of the light-controlling element. It further can increase the changing width of transmittance due to the swelling and shrinking of the stimulus-responsive polymer gel.

The light-controlling element of the invention can be used either as a single light-controlling element or by accumulating plural light-controlling elements. It is possible to form a multilayer-type color display device by using plural light-controlling elements which have stimulus-responsive polymer gels containing different colored pigments (light-controlling materials).

When the stimulus-responsive polymer gel 1 contains a light-controlling material having a concentration not less than the concentration of saturated absorption or saturated scattering, the efficiency of absorbing light changes with a change in the volume of the stimulus-responsive polymer gel 1, thereby changing the optical density. To be more specific, it becomes possible to prepare a light-controlling element which has a higher optical density when the polymer gel is swollen and a lower optical density when it is shrunk.

<Stimulus-Responsive Polymer Gel>

The following is a description of stimulus-responsive polymer gels usable in the invention. Stimulus-responsive polymer gels change in volume (swell and shrink) by absorbing or discharging liquid by the provision of a stimulus such as a pH change, an ion intensity change, absorption or discharge of a chemical material, a solvent composition change, or the provision of heat, light, electric current, or electric field.

In the invention, the volume change in the stimulus-responsive polymer gel can be either nonreversible or reversible; however, to be reversible is preferable. Specific examples of the stimulus-responsive polymer gels usable in the invention will be shown as follows.

As polymer gels, which respond to the stimulus of a pH-change, electrolytic polymer gels are preferable. Examples of such electrolytic polymer gels include: cross-linked substances of poly(meth)acrylic acids and salts thereof; cross-linked substances of copolymers of (meth)acrylic acids and (meth)acrylamides, hydroxyethyl(meth)acrylates, or alkyl (meth)acrylate, and salts thereof; cross-linked substances of polymaleic acids and salts thereof; cross-linked substances of copolymers of maleic acids and (meth)acrylamides, hydroxyethyl(meth)acrylates, or alkyl (meth)acrylate and salts thereof; cross-linked substances of polyvinyl sulfonic acids, or cross-linked substances of copolymers of vinyl sulfonic acids and (meth)acrylamides, hydroxyethyl(meth)acrylates, or alkyl (meth)acrylate; cross-linked substances of polyvinyl benzene sulfonic acids and salts thereof; cross-linked substances of copolymers of vinyl benzene sulfonic acids and (meth)acrylamides, hydroxyethyl(meth)acrylates, or alkyl (meth)acrylate, and salts thereof; cross-linked substances of polyacrylamide alkyl sulfonic acids and salts thereof; cross-linked substances of copolymers of acrylamide alkyl sulfonic acids and (meth)acrylamides, hydroxyethyl(meth)acrylates or alkyl(meth)acrylate, and salts thereof; cross-linked substances of polydimethylamino propyl(meth)acrylamides and their hydrochlorides; cross-linked substances of copolymers of dimethylamino propyl(meth)acrylamides and (meth) acrylic acids, (meth)acrylamides, hydroxyethyl(meth)acrylates, or alkyl(meth)acrylate, their quaternary compounds and salts; cross-linked substances of composites of polydimethylamino propyl(meth)acrylamides and polyvinyl alcohols, their quaternary compounds and salts; cross-linked substances of composites of polyvinyl alcohols and poly(meth)acrylic acids and salts thereof; cross-linked substances of carboxyalkyl cellulose salts; and partial hydrolysates of the cross-linked substances of poly(meth)acrylonitriles and salts thereof.

The pH change is preferably caused by electrode reactions such as liquid electrolysis or oxidation-reduction reactions of compounds to be added, or oxidation-reduction reactions of conductive polymers, and additions of chemical substances, which change pH.

As polymer gels, which respond to the stimulus of an ion concentration, change, ionic polymer materials similar to the aforementioned stimulus-responsive polymer gels responding to a pH change can be used. Ion concentration changes are preferably caused by the addition of salt or the like, or the use of ion-exchanging resin.

As polymer gels which respond to the stimulus of the absorption or discharge of a chemical substance, strong ionic polymer gels are preferable. Examples of such strong ionic polymer gels include: cross-linked substances of polyvinyl sulfonic acids; cross-linked substances of copolymers of vinyl sulfonic acids and (meth)acrylamides, hydroxyethyl (meth)acrylates, or alkyl(meth)acrylate; cross-linked substances of polyvinyl benzene sulfonic acids; cross-linked substances of copolymers of vinyl benzene sulfonic acids and (meth)acrylamides, hydroxyethyl(meth)acrylates, or alkyl (meth)acrylate; cross-linked substances of poly(meth)acrylamide alkyl sulfonic acids; cross-linked substances of copolymers of (meth)acrylamide alkyl sulfonic acids and (meth) acrylamides, hydroxyethyl(meth)acrylates, or alkyl(meth) acrylate.

Above all, polyacrylamide alkyl sulfonic acid-based polymers are preferably used. In that case, examples of the chemical substance include: surfactants including cationic surfactants such as alkylpyridine salts including n-dodecyl pyridinium chloride, alkyl ammonium salts, phenyl ammonium salts, and phosphonium salts including tetraphenyl phosphonium chloride.

Polymer gels, which respond to the stimulus of the application of magnetic field, include cross-linked substances of polyvinyl alcohols containing ferromagnetic particles or magnetic fluid; however, polymer gels themselves are not particularly limited and anything in the category of polymer gels can be used.

Polymer gels which respond to the stimulus of a change in solvent composition generally include almost all polymer gels, and making use of good solvents and poor solvents of the polymer gels can cause swelling and shrinking.

As polymer gels which respond to the stimulus of the provision of current or electric field, CT complexes (charge-transfer complexes) of cationic polymer gels and electron-accepting compounds are preferable. Specific examples include: cross-linked substances of amino substituted (meth) acrylamides such as dimethylamino propyl(meth)acrylamides; cross-linked substances of (meth)acrylic acid amino substituted alkyl esters such as dimethylaminoethyl(meth) acrylates, diethylaminoethyl(meth)acrylates, or dimethylamino propyl acrylates; cross-linked substances of polystyrenes; cross-linked substances of polyvinyl pyridines; cross-linked substances of polyvinyl carbazole; and cross-linked substances of polydimethylamino styrenes. And particularly preferable examples are dialkylamino alkyl(meth)acrylate-based polymers such as dimethylamino ethyl(meth)acrylates, diethylamino ethyl(meth)acrylates, dimethylamino propyl (meth)acrylates, and diethylamino propyl(meth)acrylates. These can be used in combination with electron-accepting compounds such as benzoquinone, 7,7,8,8-tetracyanoquino dimethane (TCNQ), tetracyano ethylene, chloranil, trinitrobenzenes, maleic anhydrides, or iodine.

As polymer gels which respond to the stimulus of the provision of light, preferable examples include cross-linked substances of hydrophilic polymer compounds having a group which causes ionic dissociation by light, such as triaryl methane derivatives or spirobenzopyrane derivatives. The examples include cross-linked substances of copolymers of vinyl substituted triaryl methane leuco derivatives and (meth) acrylamides.

Preferable examples of thermo-responsive polymer gels include: cross-linked substrates of polymers having a LCST (lower critical solution temperature) which is the feature of aggregation by hydrophobic interaction at a certain temperature or higher and precipitating from an aqueous solution; cross-linked substrates of polymers having a UCST (upper critical solution temperature); IPN members (inter penetrating polymer network) of polymer gels composed of two components bonded by hydrogen bond; and polymer gels having a side chain with aggregating properties such as crystalline. Above all, LCST gels utilizing hydrophobic interaction are particularly preferable. LCST gels have the property of shrinking at high temperatures, whereas UCST gels, IPN gels, and crystalline gels have the property of swelling at high temperatures.

Specific compounds of the former include: cross-linked substances of N-alkyl substituted (meth)acrylamides, such as poly N-isopropyl acrylamides; cross-linked substances of copolymers of two or more components of N-alkyl substituted (meth)acrylamides, (meth)acrylic acids and salts thereof, (meth)acrylamides and alkyl (meth)acrylate; cross-linked substances of polyvinyl methyl ethers; and cross-linked substances of alkyl substituted cellulose derivatives such as methyl celluloses, ethyl celluloses, and hydroxylpropyl celluloses. Above all, poly-N-isopropyl(meth)acrylamides are preferable. On the other hand, specific compounds of the latter include: IPN substances comprising cross-linked substances of poly(meth)acrylamides and cross-linked substances of poly(meth)acrylic acids, and their partly neutralized substances (acrylic acid units are partly chlorinated); and IPN substances composed of cross-linked substrates of copolymers mainly composed of poly(meth)acrylamides and cross-linked substances of poly(meth)acrylic acids, and their partly neutralized substances. More preferable examples include: IPN substances of cross-linked substances of poly-N-alkyl substituted alkylamides, cross-linked substances of poly(meth)acrylamides, and cross-linked substances of poly (meth)acrylic acids, and their partly neutralized substances.

Examples of crystalline gels include: cross-linked substrates of copolymers of (meth)acrylic esters having a long-chain alkyl group such as an octyl group, a decyl group, a lauryl group, or a stearyl group, and (meth)acrylic acids and salts thereof. The temperature (phase transition temperature) indicating a volume change in the thermo-responsive polymer gels can be variously designed depending on the structure and composition of the polymer gels. The phase transition temperature is preferably between the boiling and coagulating points of the solvent, and is selected from the range of −30 to 300° C., more preferably from the range of −10 to 150° C., and particularly preferably from the range of 0 to 60° C.

As the stimulus-responsive polymer gels, in addition to the aforementioned specific examples, gels showing plural phase transition points with changing temperature can be preferably used. Specific examples include: IPN substances of cross-linked substances of polyalkyl substituted (meth)acrylamides, such as poly-N-isopropyl (meth)acrylamides and poly (meth)acrylic acids. These gels are known to show two phase transition points of swelling-shrinking-swelling with increasing temperature.

It is preferable to make a polymer gel contain an ionic functional group for the purpose of increasing the amount of volume change in a thermo-responsive polymer gel. Examples of the ionic functional group include: carboxylic acids, sulfonic acids, ammonium groups, and phosphoric acid groups. The ionic functional groups can be contained by the following methods: in preparing a polymer gel, monomers having these functional groups are copolymerized; monomers are impregnated with synthesized stimulus-responsive polymer gels to polymerize so as to form IPN (inter penetrating polymer network) substances; and the functional groups in the stimulus-responsive polymer gels are partly converted by chemical reaction such as hydrolysis or oxidation reaction.

The amount of volume change in a stimulus-responsive polymer gel of the invention is not particularly limited; however, it is preferable that the amount is higher, and the volume ratio of a swollen state to a shrunk state is preferably 3 or greater, and more preferably 5 or greater. The volume change in the stimulus-responsive polymer gel of the invention can be either irreversible or reversible; however, when used as a light-controlling element, the gel is preferably reversible. The amount of liquid absorption when the stimulus-responsive polymer gel is in a swollen state is preferably (the mass of liquid/the mass of stimulus-responsive polymer gel in a dry state)=from 5 to 500. When the ratio is 5 or greater, the volume change in the stimulus-responsive polymer gel is sufficient, and when it is 500 or below, the intensity of the polymer gel can be secured. Furthermore, when a light-controlling material which will be described later is contained, the light-controlling material has a sufficient concentration inside the stimulus-responsive polymer gel, thereby obtaining sufficient light-controlling properties.

It is possible to copolymerize or combine an ultraviolet absorbent, a light stabilizer, or other various kinds of stabilizers with the stimulus-responsive polymer gel within the range of not damaging the properties. For example, it is preferable to copolymerize or combine hindered amine-based or hindered phenol-based compounds, or compounds having a light-stabilizing function. The amount of copolymerization or combination of these compounds is preferably in the range of 0.01 to 5% by mass of the polymer gel.

The average particle size of a stimulus-responsive polymer gel used in the invention is preferably in the range of 0.01 μm to 5 mm, more preferably in the range of 0.1 μm to 1 mm, and most preferably in the range of 5 μm to 100 μm in a swollen state. When the average particle size is 0.01 μm or greater, sufficient optical properties can be obtained and aggregation is less caused, thereby facilitating the handling of the gel. On the other hand, when it is 5 mm or smaller, there are effects such as an increase in response speed and an improvement in a sense of particles of the element.

Such stimulus-responsive polymer gel particles can be manufactured by a method of physically pulverizing a polymer gel into particles; a method of chemically pulverizing a polymer before cross-linking and then cross-linking the polymer to obtain polymer gel particles; or by general particle-producing methods, such as emulsion polymerization method, suspension polymerization method, and dispersion polymerization method. It is also possible to press out a polymer which has not been cross-linked yet through a nozzle base or the like to form into fiber, to cross-link the fiber, and to pulverize the cross-linked fiber, or to pulverize the fiber to form into particles, and then to cross-link the particles.

When these stimulus-responsive polymer gels are used in light-controlling elements, it is preferable to add a light-controlling material such as a coloring material (a pigment or a dye) or a light-scattering material to these stimulus-responsive polymer gels. Examples of the light-controlling material to be added include: dyes, pigments, and light-scattering members. The light-controlling materials are preferably stabilized to the stimulus-responsive polymer gels either physically or chemically.

The light-controlling materials are preferably added as much as to exceed the concentration of saturated absorption or the concentration of saturated scattering when the polymer gel is in a dry or shrunk state. Here, to be at the concentration of saturated absorption (or scattering) or higher indicates the region where the relation between the concentration of a light-controlling material and the amount of light absorption in a specific light path length greatly deviates from a primary straight line relation. The addition of a light-controlling material having such a concentration to a stimulus-responsive polymer gel can change the optical density or scattering due to the swelling and shrinking of the stimulus-responsive polymer gel.

The concentration of a light-controlling material which is equal to or over the concentration of saturated absorption or the concentration of saturated scattering is generally in the range of 3% by mass or higher, and it is preferable that the light-controlling material is added to the stimulus-responsive polymer gel in the range of 3 to 95% by mass, and more preferably in the range of 5 to 80% by mass. When it is 3% by mass or greater, the effect of adding the light-controlling material is sufficient, and when it is 95% by mass or below, the stimulus-responsive polymer gel can have excellent properties.

Preferable examples of the dyes include: black nigrosin-based dyes; azo dyes which have colors such as red, green, blue, cyan, magenta, and yellow; anthraquinone-based dyes; indigo-based dyes; phthalocyanine-based dyes; carbonium dyes; quinone imine dyes; methine dyes; quinoline dyes; nitro dyes; benzoquinone dyes; naphthoquinone dyes; naphthalimido dyes; and beryllon dyes. In particular, those having a high absorption coefficient are preferable. Examples of such dyes include: C.I. direct yellow 1, 8, 11, 12, 24, 26, 27, 28, 33, 39, 44, 50, 58, 85, 86, 87, 88, 89, 98, 157; C.I. acid yellow 1, 3, 7, 11, 17, 19, 23, 25, 29, 38, 44, 79, 127, 144, 245; C.I. basic yellow 1, 2, 11, 34; C.I. food yellow 4; C.I. reactive yellow 37; C.I. solvent yellow 6, 9, 17, 31, 35, 100, 102, 103, 105; C.I. direct red 1, 2, 4, 9, 11, 13, 17, 20, 23, 24, 28, 31, 33, 37, 39, 44, 46, 62, 63, 75, 79, 80, 81, 83, 84, 89, 95, 99, 113, 197, 201, 218, 220, 224, 225, 226, 227, 228, 229, 230, 231, C.I acid red 1, 6, 8, 9, 13, 14, 18, 26, 27, 35, 37, 42, 52, 82, 85, 87, 89, 92, 97, 106, 111, 114, 115, 118, 134, 158, 186, 249, 254, 289; C.I. basic red 1, 2, 9, 12, 14, 17, 18, 37; C.I. food red 14; C.I. reactive red 23, 180; C.I. solvent red 5, 16, 17, 18, 19, 22, 23, 143, 145, 146, 149, 150, 151, 157, 158; C.I. direct blue 1, 2, 6, 15, 22, 25, 41, 71, 76, 78, 86, 87, 90, 98, 163, 165, 199, 202; C.I. acid blue 1, 7, 9, 22, 23, 25, 29, 40, 41, 43, 45, 78, 80, 82, 92, 93, 127, 249; C.I. basic blue 1, 3, 5, 7, 9, 22, 24, 25, 26, 28, 29; C.I. food blue 2; C.I. solvent blue 22, 63, 78, 83-86, 191, 194, 195, 104; C.I. direct black 2, 7, 19, 22, 24, 32, 38, 51, 56, 63, 71, 74, 75, 77, 108, 154, 168, 171; C.I. acid black 1, 2, 7, 24, 26, 29, 31, 44, 48, 50, 52, 94; C.I. basic black 2, 8; C.I. food black 1, 2; C.I. reactive black 31; C.I. food violet 2; C.I. solvent violet 31, 33, 37; C.I. solvent green 24, 25; and C.I. solvent brown 3, 9. These dyes can be used alone or in combination so as to produce desired colors.

Examples of general pigments include: black pigments including various kinds of carbon blacks (such as channel black and furnace black) and titanium blacks; white pigments including metal oxides such as titanium oxides, and color pigments. Examples of the color pigments include: benzidine-based yellow pigments, rhodamine-based magenta pigments; phthalocyanine-based cyan pigments; and other color pigments such as anthraquinone-based, azo-based, azo metal complexes, phthalocyanine-based, quinacridone-based, perylene-based, indigo-based, isoindolinone-based, quinacridone-based, and arylamide-based.

More specific examples of the pigments include: white pigments made from inorganic oxides such as zinc oxide, basic lead carbonate, basic lead sulfate, lead sulfate, lithopone, muscovite, zinc sulfide, titanium oxide, antimony oxide, white lead, zirconium oxide, alumina, micanite, micarex, quartz, calcium carbonate, plaster, clay, silica, silicon, silicon earth, talc, basic magnesium carbonate, alumina white, gloss white, and satine white; pigments made from metal materials such as zinc, alumel, antimony, aluminum, aluminum alloy, iridium, indium, osmium, chrome, chromel, cobalt, zirconium, stainless steel, gold, silver, nickel silver, copper, bronze, tin, tungsten, tungsten steel, iron, lead, nickel, nickel alloy, nickelin, platinum, platinum-rhodium, tantalum, duralumin, nichrome, titanium, krupp-austenitic steel, constantan, brass, platinum iridium, palladium, palladium alloy, molybdenum, molybdenum steel, manganese, manganese alloy, rhodium, and rhodium gold; and pigments made from polymer materials such as phenol resin, furan resin, xylene-formaldehyde resin, urea resin, melamine resin, aniline resin, alkyd resin, unsaturated polyester, epoxy resin, polyethylene, polypropylene, polystyrene, poly-p-xylene, polyvinyl acetate, acrylic resin, methacryl resin, polyvinyl chloride, polyvinylidene chloride, fluorine-based plastic, polyacrylonitrile, polyvinyl ether, polyvinyl ketone, polyether, polycarbonate, thermoplastic polyester, polyamide, diene-based plastic, polyurethane-based plastic, polyphenylene, polyphenylene oxide, polysulfone, aromatic heterocyclic polymer, silicone, natural rubber-based plastic, and cellulose-based plastic.

Specific examples of the yellow-based pigments include: compounds such as condensed azo compounds, iso-indolinone compounds, anthraquinone compounds, azo metal complexes, methine compounds, and arylamide compounds. To be more specific, preferable examples include: C.I. pigment yellow 12, 13, 14, 15, 17, 62, 74, 83, 93, 94, 95, 109, 110, 111, 128, 129, 147, and 168.

Specific examples of the magenta-based pigments include: condensed azo compounds, diketo pyrrolo pyrrole compounds, anthraquinone, quinacridon compounds, basic dye lake compounds, naphthol compounds, benz-imidazolone compounds, thioindigo compounds, and perylene compounds. To be more specific, particularly preferable examples include: C.I. pigment red 2, 3, 5, 6, 7, 23, 48; 2, 48; 3, 48; 4, 57; 1, 81; 1, 144, 146, 166, 169, 177, 184, 185, 202, 206, 220, 221, and 254.

Specific examples of the cyan-based pigments include: copper phthalocyanine compounds and their derivatives, anthraquinone compounds, and basic dye lake compounds. To be more specific, preferable pigments include: C.I. pigment blue 1, 7, 15, 15:1, 15:2, 15; 3, 15:4, 60, 62, and 66.

The particle size as the volume average particle size of the primary particles of the pigments used is preferably 0.001 to 1 μm, and particularly preferably 0.01 to 0.5 μm. This is because the particle sizes not less than 0.001 μm can reduce an outflow from the polymer gel, and the particle sizes not more than 1 μm can provide excellent color developing properties and light scattering properties.

Specific examples of preferable inorganic materials for light-scattering materials include: inorganic oxides such as zinc oxide, basic lead carbonate, basic lead sulfate, lead sulfate, lithopone, muscovite, zinc sulfide, titanium oxide, antimony oxide, white lead, zirconium oxide, alumina, micanite, micarex, quartz, calcium carbonate, plaster, clay, silica, silicon, silicon earth, talc, basic magnesium carbonate, alumina white, gloss white, and satine white; metal materials such as zinc, alumel, antimony, aluminum, aluminum alloy, iridium, indium, osmium, chrome, chromel, cobalt, zirconium, stainless steel, gold, silver, nickel silver, copper, bronze, tin, tungsten, tungsten steel, iron, lead, nickel, nickel alloy, nickelin, platinum, platinum-rhodium, tantalum, duralumin, nichrome, titanium, krupp-austenitic steel, constantan, brass, platinum iridium, palladium, palladium alloy, molybdenum, molybdenum steel, manganese, manganese alloy, rhodium, and rhodium gold; and inorganic conductive materials such as ITO (indium-tin oxide). Above all, mica, aluminum, and other similar members can be preferably used as coating film.

Specific examples of preferable organic materials for the light-scattering materials include: phenol resin, furan resin, xylene-formaldehyde resin, urea resin, melamine resin, aniline resin, alkyd resin, unsaturated polyester, epoxy resin, polyethylene, polypropylene, polystyrene, poly-p-xylene, polyvinyl acetate, acrylic resin, methacryl resin, polyvinyl chloride, polyvinylidene chloride, fluorine-based plastic, polyacrylonitrile, polyvinyl ether, polyvinyl ketone, polyether, polycarbonate, thermoplastic polyester, polyamide, diene-based plastic, polyurethane-based plastic, polyphenylene, polyphenylene oxide, polysulfone, aromatic heterocyclic polymer, silicone, natural rubber-based plastic, cellulose-based plastic, and a polymer blend of two or more kinds of these polymer materials.

It is preferable to use as the light-controlling materials, chemically modified light-controlling materials such as light-controlling materials having a group capable of performing an addition reaction or a polymerizable group for covalent bonding with a polymer gel, or light-controlling materials having a group which has an interaction with a polymer gel such as ion bonding.

As described above, pigments and light-scattering members must be contained in a polymer gel and not flow out of the gel. For this, it is preferable to physically enclose the pigments and light-scattering members in a polymer network by optimizing the cross-linking density of the polymer gel; to use pigments and light-scattering members which have high interaction with the polymer gel electrically, ionically, or physically; and to use pigments and light-scattering materials having a chemically modified surface. For example, the pigments and light-scattering members having a chemically modified surface include: materials in which an unsaturated group, such as a vinyl group, or a group that chemically bonds with a polymer gel, such as an unpaired electron (radical), has been introduced into the surface of the pigment or light scattering member; and materials in which the pigment or light scattering material and a polymer material are graft bonded with each other.

A polymer gel containing such a light-controlling material can be manufactured by a method of homogeneously dispersing/mixing a light-controlling material into/with a polymer which has not been cross-linked, and cross-linking the polymer after mixture, or by a method of adding a light-controlling material to a polymer precursor monomer composition during polymerization. When a pigment or light-scattering member is added during polymerization, it is preferable to use a pigment or light-scattering member having a polymerizable group or an unpaired electron (radical) and to chemically bond it to a polymer gel.

It is preferable that light-controlling materials are dispersed into the color developing material as homogeneously as possible. In particular, in the dispersion into a polymer, it is preferable to disperse it homogeneously by making use of a mechanical kneading method, a stirring method, or a dispersant agent. The particles of a polymer gel containing a light-controlling material can be synthesized by the same method as the one used for the particles of the aforementioned polymer gel.

<Liquid>

Examples of the liquid which is absorbed or discharged by stimulus-responsive polymer gels include: water, various organic solvents, and mixtures of two or more kinds of these.

Preferable examples of absorbable or dischargeable liquids usable in the invention include: water; electrolyte aqueous solutions; alcohols such as methyl alcohol, ethyl alcohol, propyl alcohol, butyl alcohol, ethylene glycol, and propylene glycol; ketones such as acetone and methyl ethyl ketone; ethers; esters; dimethyl formamide; dimethyl acetamide; dimethyl sulfoxide; acetonitrile; propylene carbonate; aliphatic or aromatic organic solvents; and their mixtures. Above all, water and alcohols are preferable in terms of safety.

It is possible to add a stabilizer such as a dispersion stabilizer, an antioxidant, and an ultraviolet absorber, an antibacterial agent, or an antiseptic to the liquid. It is also possible to dissolve a material for changing the volume changing properties of the stimulus-responsive polymer gel. It is also possible to add coloring elements such as various kinds of pigments, white pigments and dyes.

The mixture ratio of a stimulus-responsive polymer gel to liquid is preferably in the range of 1/2000 to 1/5 (polymer gel/liquid) in a mass ratio, and more preferably in the range of 1/300 to 1/15. When the mass ratio is 1/2000 or below, the composition has excellent physical properties including mechanical strength, while when the mass ratio is 1/5 or higher, it increases the amount of volume change due to a stimulus response or the response speed.

The boiling points of these liquids are preferably 80° C. or higher, more preferably 100° C. or higher, and particularly preferably 150° C. or higher. When the boiling point is low, there are fears that the liquid gradually evaporates from inside the light-controlling element to slow the volume change of the stimulus-responsive polymer gel, or that bubbles are caused in the light-controlling element to damage its appearance. To avoid these problems, it is preferable to dissolve a solvent having a high boiling point or a nonvolatile compound so as to make use of an increase in the molar boiling point, thereby increasing the boiling point.

<Substrate>

Examples of the substrates used in the light-controlling element of the invention include: film or plate made of polyester, polyimide, polyolefin, acrylic resins such as poly methyl(meth)acrylate, polystyrene, polypropylene, polyethylene, nylon, and polyvinyl chloride; glass substrates; metal substrates; and ceramic substrates. The thickness of the substrates is preferably 10 μm to 2 mm, and the size can be selected according to object, without being particularly limited. In a light-controlling element where a polymer gel composition layer is sandwiched between a pair of substrates, at least one of the substrates must be transparent.

<Holding Member>

In the light-controlling element of the invention, the liquid, which can be absorbed or discharged by a stimulus-responsive polymer gel, is held in a holding member. In the invention, the holding member refers to a material having a function of reducing the fluidity of the liquid. The use of a holding member can prevent the liquid inside from scattering when the light-controlling element is broken, thereby increasing the safety. Furthermore, even when the light-controlling element is increased in area, the substrates are not deformed by the weight of the liquid. The following is a description about the holding member.

Preferable examples of the holding member in the invention include: cured products of curable resin formed by three-dimensionally cross linking a polymer, or polymer compounds. When a cured product of a curable resin is used as the holding member in the invention, in order to distinguish curable resins from their cured products, a curable resin may be referred to as a holding member precursor, and its cured product may be referred to as a holding member.

When a cured product of a curable resin is used as the holding member, it is preferable to prepare a curable resin solution in which a curable resin has dissolved in a liquid which is absorbed or discharged by the stimulus-responsive polymer gel and then to apply the curable resin solution between the substrates into which the stimulus-responsive polymer gel has been fixed, or to apply the curable resin solution on the surface of the substrate on which the stimulus-responsive polymer gel has been fixed and then to cure the curable resin by an appropriate curing means to form a non-sagging gel condition.

Preferable examples of the curable resins include: ultraviolet curable resins, radiation curable resins, and thermosetting resins. The use of a curable resin is preferable because it can be easily supplied between the substrates in the state of liquid with low viscosity, even when the space between the substrates is small.

Furthermore, the curable resin is preferably a water-soluble polymer compound because it enables water to be used as the liquid which is absorbed or discharged by a stimulus-responsive polymer gel, thereby providing a light-controlling element with high safety.

The ultraviolet curable resin can be any ultraviolet curable resin, as long as it is a well-known ultraviolet curable resin capable of containing the liquid which is absorbed or discharged by a stimulus-responsive polymer gel, such as a combination of an acryl-based or vinyl ether-based light curable resin or polymer modified with a radical reactive group and a photo radial initiator. Preferable examples of the ultraviolet curable resins include: reactive polymers in which a poly(meth)acrylic acid has been modified with a radical reactive group; reactive polymers in which polyvinyl alcohol has been modified with a radical reactive group; and reactive polymers in which polyacrylamide has been modified with a radical reactive group. These reactive polymers are used together with a photo radical initiator and the like.

The radiation curable resin can be any radiation curable resin, as long as it is a polymer which can form a cross-linking structure between polymers by the application of radiation and which can contain the liquid that is absorbed or discharged by a stimulus-responsive polymer gel inside, such as polyethylene, polypropylene, polystyrene, polyacrylate, polyacrylamide, polyvinyl chloride, polyacrylonitrile, polyvinyl acetate, polydimethyl siloxane, natural rubber, polyamide, polyvinyl alcohol, polyvinyl pyrrolidone, polyisobutylene, poly α-methylstyrene, polymethacrylate, polymethacrylamide, polymethacrylonitrile, polyvinylidene chloride, polytrifluoroethylene chloride, polytetrafluoroethylene, and cellulose.

Preferable examples of the radiation curable resins include: polyacrylamide, polymethacrylate, and polyvinyl pyrrolidone.

The thermosetting resin can be any thermosetting resin, as long as it is a well-known thermosetting resin capable of containing a liquid which can be absorbed or discharged by a stimulus-responsive gel. Specific examples include: a combination of a radical polymerizable monomer, a radical polymerizable cross-linking agent, and a thermal radical initiator; a combination of a polymer compound and a cross-linking agent capable of forming a cross-linking structure between polymers; and a polymer compound capable of forming physical cross-linking between polymers by heat. Examples of the polymer compound capable of forming physical cross-linking between polymers by heat include: polymer compounds whose state becomes that of a solution at high temperatures due to cutting of cross-links between polymers, and whose state becomes that of a gel when cooling is carried out due to forming of physical cross-links between polymers.

It is preferable that the aforementioned curable resins do not affect the stimulus response of the stimulus-responsive polymer gels; however, it is permissible as long as it does not affect the light-controlling properties.

The ratio of the liquid which is absorbed or discharged by a stimulus-responsive gel held in a holding member to the holding member in a dry state is preferably in the range of 0.3 to 0.002 in the condition that [the mass of the holding member in a dry state]/[the mass of the liquid+the mass of the holding member in a dry state]. A more preferable range is 0.1 to 0.005, and a further preferable range is 0.03 to 0.015. When [the mass of the holding member in a dry state]/[the mass of the liquid+the mass of the holding member in a dry state] is 0.3 or below, there is no limitation on the volume changing properties of the stimulus-responsive polymer gel, which makes it possible to obtain sufficient light-controlling performance. When it is over 0.002, the strength of the holding member can be secured.

When a polymer compound is used as the holding member, the kind of the polymer compound is not limited as long as it can be compatible with a liquid which can be absorbed or discharged by a stimulus-responsive polymer gel. The viscosity of the mixture of the polymer compound and the liquid which can be absorbed or discharged by the stimulus-responsive polymer gel is preferably 1000 mPa·s at 20° C., and more preferably 3000 mPa·s, and particularly preferably 10000 mPa·s. When the viscosity of the mixture is 1000 mPa·s or higher, its fluidity decreases, making it harder for the inner liquid to scatter when the light-controlling element is broken, thereby showing excellent safety. In addition, when the light-controlling element is increased in area, the substrates do not deform very much, with no fear of damaging the performance of the light-controlling element due to substrate deformation. It is preferable that the mixture does not affect the responding performance of the stimulus-responsive polymer gel; however, it is permissible as long as the light-controlling properties are not damaged.

In the invention, the viscosity of the mixture is measured by using a corn rotor-type viscometer (trade name: TV20H) manufactured by Toki Sangyo Co., Ltd. and a standard rotor at 1.0 rpm. When viscosity measurement is hard because the holding member has been completely cured without showing any fluidity, the presence of sufficient properties as a holding member has been confirmed as follows: aside from the preparation of a light-controlling element, 2 ml of a solution which has not been cured yet is put in a test tube having an inner diameter of 1 cm and is cured by a curing means. Then, the test tube is set upside down to see it that the cured resin (holding member) dose not fall by gravity.

<Stimulus Providing Member>

The stimulus providing member for use in the light-controlling element of the invention is selected from those capable of providing an appropriate stimulus to a stimulus-responsive polymer gel. Therefore, in the case of electric-responsive polymer gels, an electrode is used as the stimulus providing member, and in the case of thermo-responsive polymer gels, a heating resistor is used. The stimulus providing member preferably used in the invention is an electrode for mainly providing electric stimulus. The structure of the electrode can be either a simple matrix electrode type or a pixel division electrode type.

To be more specific, in the case of providing an electric stimulus, examples of preferable electrodes include: those made of a film of metal such as copper, aluminum, silver, gold, nickel, or platinum; those made of a metal oxide such as tin oxide-indium oxide (ITO): those made of a conductive polymer such as polypyrrole, polythiophene, polyaniline, polyphenylenevinylene, polyacene, and polyacetylene; and those made of a composition material of a polymer and the particles of the aforementioned metals or metal oxides. Although these electrode structures can be wired for simple matrix driving, it is also possible to provide switching elements, such as thin film transistor (TFT) elements or two-terminal elements such as MIM elements or varistors.

When heat is provided as a stimulus, it is preferable to use a combination of the aforementioned electrode and a metal such as a Ni—Cr compound, a metal oxide such as a tantalum oxide or an ITO, or a heating resistor such as carbon. Besides these, it is possible to provide a layer for providing light, magnetic field, or electromagnetic field as the stimulus providing member.

<Sealing Member>

The sealing member can be made of any material, as long as it has the ability to reduce the evaporation or volatilization of liquid from the light-controlling element, adheres to the substrates, produces no ill effect on the properties of the light-controlling element, and can keep these conditions for a long period of time under the actual use condition. It is also possible to combine two or more sealing members.

About the sealing member and sealing method, sealing is preferably done in a single layer, considering the ensuring of an opening area of the light-controlling element and the processing cost to be reduced by process simplification. As the sealing member for the single-layer sealing, it is possible to use a thermosetting elastic sealing member mainly composed of an isobutylene oligomer having a reactive group at its terminal, or an acryl-based ultraviolet curable resin. In the case of two-layer sealing, it is possible to use a polyisobutylene-based sealant for the primary sealing in contact with a polymer gel composition layer, and to use an acrylic resin as the secondary sealing. The sealing member and sealing method of the invention are not limited to the exemplified ones, and other various kinds can be selected and combined.

<Spacer>

In a light-controlling element in which a polymer gel composition layer is sandwiched between a pair of substrates, a spacer for keeping the space between the substrates can be used. In that case, the inside of the light-controlling element has only to have a uniform space for holding a stimulus-responsive polymer gel and a liquid which can be absorbed to the stimulus-responsive polymer gel. If necessary, a minimum amount of spacer can be used not to cause image defect.

The space between the substrates formed by a spacer is selected from 1 μm to 5 mm, and more preferably from 10 μm to 1 mm. The space of 1 μm or greater between the substrates can increase the amount of light control, and when the space is 5 mm or smaller, the increasing weight in the light-controlling element and other problems are hardly caused.

The shape of the spacer is not particularly limited, as long as it can keep the space in a stable manner; however, it preferably has an independent shape such as a sphere, a cube, or a pillar. It is also possible to use a spacer having a consecutive shape. In that case, the spacer can have the function of segmenting the polymer gel composition layer by forming a mesh, in addition to the function of holding the space. This can provide the effect of reducing the occurrence of malfunction of adjacent pixels, thereby improving display quality.

The consecutive shape of the spacer is not particularly limited as long as it can keep the space in a stable manner, and various shapes can be applied such as polygons like a lattice or a honeycomb. In the case of the spacer having the function of segmenting the inside of the light-controlling element, the lattice is the most preferable shape, considering the shapes of pixels and the stimulus providing member. These spacers are not particularly limited, as long as they are made of materials stable in the liquid which can be absorbed by a stimulus-responsive polymer gel such as resin, metal, metal oxide, and glass.

-Method for Manufacturing the Light-Controlling Element-

The light-controlling element of the invention can be manufactured by the following manufacturing method, which is not, however, the only manufacturing method available.

A method for manufacturing the light-controlling element shown in FIG. 1 can at least comprises arranging a stimulus-responsive polymer gel on a surface of a temporary support, forming a holding member by applying a holding member precursor onto the surface of the temporary support on which the stimulus-responsive polymer gel has been arranged, and curing the holding member precursor, and removing the temporary support. As the temporary support, the aforementioned substrates can be used.

A method for manufacturing the light-controlling element shown in FIG. 2 can at least comprises arranging a stimulus-responsive polymer gel on a surface of a substrate, forming a holding member by applying a holding member precursor onto the surface of the substrate on which the stimulus-responsive polymer gel has been arranged and curing the holding member precursor.

A method for manufacturing the light-controlling element shown in FIG. 3 can at least comprises fixing a stimulus-responsive polymer gel onto a surface of a substrate, preparing a cell by disposing the substrate and another substrate so as to face each other with a specific space therebetween in such a manner that the surface of the substrate having the stimulus-responsive polymer gel fixed thereon faces the other substrate and sealing a periphery of the substrates, injecting a holding member precursor into the cell and forming a holding member by curing the holding member precursor.

Another method for manufacturing the light-controlling element shown in FIG. 3 can at least comprises fixing a stimulus-responsive polymer gel onto a surface of a substrate, applying a holding member precursor onto at least one surface of the substrate, disposing a pair of substrates so as to face each other in such a manner that the surface of the substrate on which the stimulus-responsive polymer gel has been fixed and the another surface of the substrate on which the holding member precursor has been applied face inward, forming a holding member by curing the holding member precursor and sealing a periphery of the substrates.

<Method for Arranging a Stimulus-Responsive Polymer Gel>

The light-controlling element of the invention is characterized in that the stimulus-responsive polymer gel is arranged in a single layer. The following is a description of the method for arrangement of the stimulus-responsive polymer gel. In general, there is a difference in density between a stimulus-responsive polymer gel and a holding member precursor, so that if a dispersion solution containing the stimulus-responsive polymer gel and the holding member precursor is left for a certain length of time, the stimulus-responsive polymer gel moves downwards or upwards due to gravity or buoyancy. By using this feature, a holding member precursor solution containing a stimulus-responsive polymer gel is applied on or sandwiched between the substrates, and left for a certain length of time, thereby arranging the stimulus-responsive polymer gel on the surface of the substrate in a single layer.

When the stimulus-responsive polymer gel contains an ionic functional group or a charged light-controlling material, it is possible to apply electric field from outside so as to move the electrophoresis of the stimulus-responsive polymer gel particles, thereby arranging the gel particles on the surface of the substrate. The stimulus-responsive polymer gel can be disposed in contact with the surface of the substrate.

<Method for Fixing the Stimulus-Responsive Polymer Gel>

In the light-controlling element of the invention, a stimulus-responsive polymer gel can be fixed on the surface of the substrate. The following is a description of the fixing method.

The fixation of the stimulus-responsive polymer gel used in the invention onto the surface of the substrate is performed by using the stimulus-responsive polymer gel in a desired swollen state. The fixation of the stimulus-responsive polymer gel is preferably done by adhesion, chemical bonding, or the like. In view of the fixation strength, chemical bonding is preferable. Examples of the chemical bonding include: ion bonding, hydrogen bonding, and covalent bonding. Above all, covalent bonding is most preferable from the viewpoint of stability, and it is performed through a reaction with various fixation agents.

Examples of the fixation agents for the stimulus-responsive polymer gel of the invention include compounds having two or more of polymerizable unsaturated groups or reactive functional groups. Examples of the compounds having two or more reactive functional groups include: di- or tri(meth)acrylates of polyoles such as ethylene glycol, propylene glycol, trimethylol propane, glycerin polyoxy ethylene glycol, polyoxy propylene glycol, and polyglycerin; unsaturated polyesters obtained by reacting the polyoles with unsaturated acids such as maleic acid or fumaric acid; bis(meth)acrylamides such as N,N'-methylene bis(meth)acrylamide; di(meth)acrylic acid carbamate obtained by reacting polyisocyanate such as tolylene diisocyanate, or hexamethylene diisocyanate and hydroxyethyl(meth)acrylate; polyhydric aryls such as arylated starch, arylated cellulose, diarylphthalate, other tetraaryloxy ethane, pentane erythritol triarylether, trimethylol propane triarylether, diethylene glycol diarylether, and triaryl trimethylether. Of these, the invention preferably uses ethylene glycol di(meth)acrylate, propylene glycol di(meth)acrylate, polyethylene glycol di(meth)acrylate, polypropylene glycol di(meth)acrylate, N,N'-methylene bis(meth)acrylamide, and the like.

Other examples of the compounds having two or more reactive functional groups include: diglycidyl ether compounds, haloepoxy compounds, di- and tri-isocyanate compounds. Examples of the diglycidyl ether compounds include: ethylene glycol diglycidyl ether, polyethylene glycol diglycidyl ether, propylene glycol diglycidyl ether, polypropylene glycol diglycidyl ether, glycerin diglycidyl ether, and polyglycerin diglycidyl ether. Examples of the haloepoxy compounds include: epichlorohydrin, epibromohydrin, and β-methyl epichlorohydrin. Examples of the diisocyanate compounds include: 2,4-tolylene diisocyanate and hexamethylene diisocyanate.

It is also possible to employ various reactive silane coupling agents including: vinyl-based silane coupling agents such as vinyl trimethoxy silane and vinyl triethoxy silane; amino-based silane coupling agents such as N-(2-aminoethyl)3-amino propyl methyl dimethoxy silane, N-(2-aminoethyl)3-amino propyl trimethoxy silane, and 3-amino propyl trimethoxy silane; and epoxy-based silane coupling agents such as 3-glycidoxypropyl trimethoxy silane, 3-glycidoxypropyl methyl dimethoxy silane, and 2-(3,4-epoxy cyclohexyl)ethyl trimethoxy silane. Of these, the invention preferably uses N-(2-aminoethyl)3-amino propyl methyl dimethoxy silane, N-(2-aminoethyl)3-amino propyl trimethoxy silane, and 3-amino propyl trimethoxy silane.

The aforementioned fixation agents can be dissolved in water, an organic solvent, or a mixture solution of these, and are usually used at 0.01 to 10% by mass and more preferably at 0.1 to 5% by mass. Examples of the organic solvent include: methanol, ethanol, IPA, toluene, benzene, acetone, THF, and methyl cellosolve. When the amount of a fixation agent used is 0.01% by mass or greater, the stimulus-responsive polymer gel can be fully fixed. On the other hand, when the amount is 10% by mass or less, it becomes possible to form a uniform thin fixation agent layer on the surface of the substrate to be fixed, so as to uniformly fix the stimulus-responsive polymer gel in a moderate degree of fixation, thereby obtaining desired light-controlling properties.

The fixation of a stimulus-responsive polymer gel is done either by soaking a substrate in a solution of a fixation agent to cause a reaction for 1 minute to 10 hours at ordinary temperature or by soaking the substrate and then pulling it out to cause a reaction for 1 minute to 10 hours at a ordinary or higher temperature, so as to introduce reactive functional groups onto the surface of the substrate. Then, the functional groups present in the molecule structure of the stimulus-responsive polymer gel are reacted with the functional groups introduced to the substrate side so as to complete the fixing process. At that moment, the functional groups in the stimulus-responsive polymer gel can be subjected to a process for increasing the reaction activities if necessary.

Examples of such a process include the addition of an acid catalyst and the addition of a carbodiimide aqueous solution. In that manner, the stimulus-responsive polymer gel can be properly fixed on the substrate in a single layer (a single particle layer). The single particle layer can be achieved by chemically combining or bonding the substrate and the stimulus-responsive polymer gel, and then washing out unnecessary stimulus-responsive polymer gel with a solvent.

<Method for Introducing (Applying or Injecting) the Holding Member>

The holding member or the holding member precursor can be applied by roll coating, gravure coating, cast coating, spray coating, reverse coating, dip coating, blade coating, comma coating, brushing; however, these are not the only methods usable. The coating of the holding member or the holding member precursor can be done by using their solutions.

In the method for manufacturing the light-controlling element of the invention, the introduction (application or injection) of the holding member or the holding member precursor is performed by the following manners; however, these are not the only methods usable.

[1] A method for injecting the holding member or the holding member precursor inside a cell prepared by disposing a substrate on which a stimulus-responsive polymer gel has been fixed and another substrate in such a manner as to face each other while keeping a specific space therebetween by the spacer or the like, and by sealing the periphery of the substrates with a sealing agent. During injection, it is preferable to reduce the pressure inside the cell so as to prevent the substrates from bending due to the weight of the solution of the holding member or the holding member precursor.

[2] A method for forming a cell by applying the holding member or the holding member precursor on at least one of the substrates, disposing two substrates to face each other with a spacer therebetween, and sealing the periphery.

In the case of using the holding member precursor, an appropriate curing means is used to cure the holding member precursor so as to form a holding member, thereby preparing a light-controlling element. In the case of applying it on the substrates, it is preferable that the holding member precursor is cured before the disposition of opposing substrates so as to prepare a holding member.

In the invention, in the case of applying the holding member or the holding member precursor, the viscosity of the holding member, the holding member precursor, or a solution thereof is preferably 100 to 10000 mPa·s, and more preferably 300 to 5000 mPa·s at 20° C. When the viscosity of the holding member, the holding member precursor, or a solution thereof is in the range of 100 to 10000 mPa·s, the uniform application of the holding member is facilitated, thereby improving productivity.

In the case of injecting the holding member or the holding member precursor, the viscosity of the holding member, the holding member precursor, or a solution thereof is preferably 1 to 2000 mPa·s, and more preferably 2 to 800 mPa·s at 20° C. When the viscosity of the holding member, the holding member precursor, or a solution thereof is in the range of 1 to 2000 mPa·s, the time required for injection is accelerated and less bubbles are trapped, thereby improving the productivity of the element.

EXAMPLES

The present invention will be described in detail in the following examples; however, the invention is not limited to these examples.

(Preparation of the Stimulus-Responsive Polymer Gel Particles A)

Stimulus-responsive (high-temperature shrinking type) polymer gel particles A (particles A) containing a coloring material are manufactured by the following process.

Nitrogen is applied for 15 minutes to an aqueous solution containing N-isopropyl acrylamide, NIPAM (3.5758 g), methylenebisacrylamide (0.0072 g), and a microcapsulized carbon black dispersion solution (trade name: MC black 082-E, manufactured by Dainippon Ink and Chemicals, Incorporated, containing 14.3% pigment) (19.1630 g) to remove oxygen dissolved in the aqueous solution. An aqueous solution (0.5106 g) of a polymerization initiator APS (ammonium persulfate) (29.9 mg) is added to the solution, and the solution is stirred to homogeneously dissolve the aqueous solution of the polymerization initiator APS. A cyclohexane (1.2 L) solution of Sorgen 50 (6.00 g) is put in a 2 L separable flask equipped with three stirring blades having a diameter of 75 mm, the previously prepared NIPAM pigment dispersion solution is added, and nitrogen is applied to carry out nitrogen substitution for the whole contents of the flask.

The flask is kept at 25° C. in a water bath, and the stirring blades are rotated at 800 rpm for 15 minutes to suspend and disperse the water phase in the cyclohexane to prepare a dispersion solution. With the number of revolutions of the stirring blades set at 250 rpm, a cyclohexane (3.2 ml) solution of TMEDA (tetramethyl ethylene diamine) (0.8 ml) is added to the dispersion solution to carry out polymerization for 2 hours, while keeping the solution at 25° C. The resultant polymer particles are well washed with dimethyl formamide and water. As a result, stimulus-responsive polymer gel particles (particles A) are produced. The prepared stimulus-responsive polymer gel particles have a volume average particle size of 20 μm at room temperature (25° C., in a swollen state). The stimulus-responsive polymer gel particles have a phase transition temperature of about 34° C. Thus, the polymer gel particles shrink at higher temperatures than the phase transition point and swell at lower temperatures than the phase transition point. The amount of volume change is about 15 times.

(Preparation of Stimulus-Responsive Polymer Gel Particles B)

Stimulus-responsive (high-temperature swelling type) polymer gel particles B (particles B) containing a coloring material are manufactured by the following process.

An aqueous solution B is prepared by mixing and stirring 1.0 g of acrylamide, 1.0 mg of methylenebisacrylamide as a cross-linking agent, 0.575 g of distilled water, and 3.425 g of an aqueous dispersion solution of a black pigment as a coloring material (trade name: MC black 082-E, manufactured by Dainippon Ink and Chemicals, Incorporated, containing 14.3% pigment). A solution containing 300 ml of toluene and 2.375 g of a sorbitol-based surfactant (trade name: Sorgen 50, manufactured by Dai-ich Kogyo Seiyaku Co., Ltd.) dissolved in the toluene is added to a reaction container in which nitrogen substitution has been carried out, and the previously prepared aqueous solution B is also added and stirred for 30 minutes at 1200 rpm with a rotary stirring device so as to prepare a suspension solution B. The obtained suspension solution B is put in a flask, oxygen is then removed by nitrogen substitution, 0.5 ml of water in which 0.004 g of ammonium persulfate as a polymerization initiator has been dissolved is added, and the resulting mixture is heated to 70° C. so as to perform polymerization for 3 hours. After the completion of the polymerization, the solution is washed for purification with a large amount of acetone and dried. As a result, acrylamide gel particles containing a coloring material are obtained.

Next, 1.5 g of an acrylic acid, 0.0015 g of methylenebisacrylamide as a cross-linking agent, and 5.5 g of distilled water are mixed, nitrogen substitution is carried out and then 0.5 g of water containing 0.006 g of ammonium persulfate is added thereto so as to obtain a mixture solution. 0.5 g of the obtained acrylamide gel particles is added to the mixture solution, and the resulting mixture solution is heated to 70° C. to perform polymerization for 3 hours so as to prepare IPN polymer gel particles (stimulus-responsive polymer gel particles B). The obtained IPN polymer gel particles (acrylic acid-acrylamide inter penetrating polymer network structure gel particles) are put in a large amount of distilled water, and the gel particles are swollen and shrunk through heating and cooling, and filtered. These operations are repeated for purification. The obtained IPN polymer gel particles in a dry state have a volume average particle size of about 15 μm. The IPN polymer gel particles are swollen by being put in a large amount of pure water. The amount of water absorption of the IPN polymer gel particles at 10° C. in equilibrium swelling is about 3 g/g. However, when the gel particles are heated to 50° C., it is found that the particles further swell and show an amount of water absorption of about 80 g/g. This phase transition point is in the temperature range of 30 to 40° C. In other words, the particles swell at higher temperatures than the phase transition point, and shrink at lower temperatures than the phase transition point. This change is reversible, and the particle size of the polymer gel particles in a swollen state is three times as large as in a shrunk state, that is, a change of about 27 times in volume.

(Preparation of Stimulus-Responsive Polymer Gel Particles C)

Stimulus-responsive (pH responsive) polymer gel particles C (particles C) containing a coloring material are manufactured by the following process.

As a main monomer, 20.0 g of acrylic acid is put in a beaker, and while cooling and stirring is carried out, 33 g of a 25% by mass aqueous solution of sodium hydroxide is dropped therein to perform about 74% neutralization. After this, a solution containing 2 g of pure water and 0.1 g of ammonium persulfate dissolved therein, 10.0 g of phthalocyanine-based blue pigment as a pigment for gel coloring, and 0.1 g of methylenebisacrylamide as a cross-linking agent are added thereto and stirred well, and then 1 g of EMULGEN 909 (manufactured by Kao Corporation) is added to prepare a homogeneous solution. The obtained solution is added to a solution which is obtained by dissolving 5.0 g of a sorbitol-based surfactant (trade name: Sorgen 50, manufactured by Dai-ich Kogyo Seiyaku Co., Ltd.) as a dispersion stabilizer to 500 g of cyclohexane in a beaker and by performing nitrogen substitution, to prepare a mixture solution. The mixture solution is emulsified by being stirred for 10 minutes at 10000 rpm using the rotary stirring blades.

Next, the temperature of the reaction system is adjusted to 25° C., and a 50% cyclohexane solution of N,N, N',N'-tetramethyl ethylene diamine is added to the mixture solution while stirring is carried out so as to perform polymerization. After the polymerization, the generated colored polymer gel particles are collected and subjected to a neutralization reaction with an aqueous solution of sodium hydroxide. After this, the particles are repeatedly washed with pure water, and dehydrated with acetone and dried. The obtained particles are classified to obtain stimulus-responsive polymer gel particles C having an average particle size of about 4 μm. The average minimum particle size (A1) of the stimulus-responsive polymer gel particles C in a swollen state is 13.6 μm when they are soaked in a water-acetone mixture solution (volume ratio 1:4), whereas the average maximum particle size (A2) in a swollen state is 29 μm when they are soaked in pure water of pH 7. The amount of pure water absorption of these colored particles is about 200 g/g.

(Preparation of Stimulus-Responsive Polymer Gel Particles D)

Stimulus-responsive (pH responsive) polymer gel particles D (particles D) containing no coloring material are manufactured by the following process.

As a main monomer, 20.0 g of acrylic acid is put in a beaker, and while cooling and stirring are carried out, 33 g of a 25% by mass aqueous solution of sodium hydroxide is dropped therein to perform about 74% neutralization. After this, a solution containing 2 g of pure water and 0.1 g of ammonium persulfate dissolved therein, and 0.1 g of methylenebisacrylamide as a cross-linking agent are added thereto and stirred well, and then 1 g of EMULGEN 909 (manufactured by Kao Corporation) is added to prepare a homogeneous solution. The obtained solution is added to a solution which is obtained by dissolving 5.0 g of a sorbitol-based surfactant (trade name: Sorgen 50, manufactured by Dai-ich Kogyo Seiyaku Co., Ltd.) as a dispersion stabilizer to 500 g of cyclohexane in a beaker and by performing nitrogen substitution, to prepare a mixture solution. The mixture solution is emulsified by being stirred for 10 minutes at 10000 rpm using the rotary stirring blades.

Next, the temperature of the reaction system is adjusted to 25° C., and a 50% cyclohexane solution of N,N, N',N'-tetramethyl ethylene diamine is added to the mixture solution while stirring is carried out so as to perform polymerization. After the polymerization, the generated colored polymer gel particles are collected and subjected to a neutralization reaction with an aqueous solution of sodium hydroxide. After this, the particles are repeatedly washed with pure water, and dehydrated with acetone and dried. The obtained particles are classified to obtain stimulus-responsive polymer gel particles D having an average particle size of about 4 μm. The average minimum particle size (A1) in a swollen state is 12.9 μm when the particles are soaked in a water-acetone mixture solution (volume ratio 1:4), whereas the average maximum particle size (A2) in a swollen state is 33 μm when they are soaked in pure water of pH 7. The amount of pure water absorption of these particles D is about 250 g/g.

(Preparation of a Substrate for Fixation)

For the preparation of a substrate for fixing stimulus-responsive polymer gel particles, a 100×100 cm glass substrate (trade name: #0200, manufactured by Matsunami Glass Ind., Ltd.) is ultrasonically cleaned with acetone and isopropyl alcohol for 30 minutes each. Then, the substrate is soaked for 30 minutes in a solution which is prepared by adding, while stirring is carried out, 80 ml of γ-amino propyl trimethoxy silane to 4000 ml of an aqueous solution of 95% ethanol adjusted to pH 5 using an acetic acid. The substrate is taken out, rinsed with methanol, and left for 1 hour in an oven at 150° C. so as to cure the silane layer, whereby a substrate S1 for fixation is prepared.

A glass plate (10×10 cm) equipped with an ITO (indium-tin oxide) electrode is ultrasonically cleaned with acetone and isopropyl alcohol for 30 minutes each. Then, the substrate is soaked for 30 minutes in a solution which is prepared by adding, while stirring is carried out, 4 ml of γ-amino propyl trimethoxy silane to 200 ml of an aqueous solution of 95% ethanol. The substrate is taken out, rinsed with methanol, and left for 1 hour in an oven at 150° C. so as to cure the silane layer, whereby a substrate S2 for fixation is prepared.

(Preparation of a Substrate to Which a Stimulus-Responsive Polymer Gel Has Been Fixed)

200 g of a water dispersion solution containing 2.3% by mass of particles A as a solid content is uniformly applied on a substrate S1 for fixation and fixed by being left for about 10 hours at room temperature. In the obtained substrate G1 to which the stimulus-responsive polymer gel particles (particle A) have been fixed, the stimulus-responsive polymer gel particles are in a swollen state in pure water of pH 7; however, the particles are fixed in a stable manner without being dissociated by stress or the like. By the aforementioned operations, a substrate G1 to which the particles A have been fixed is prepared.

200 g of an aqueous dispersion solution containing 3.5% by mass of particles B as a solid content is adjusted to pH 4.5, then uniformly applied on a substrate S1 for fixation, and fixed by being left for about 10 hours at 60° C. In the obtained substrate G2 to which the stimulus-responsive polymer gel particles (particle B) have been fixed, the stimulus-responsive polymer gel particles are in a swollen state in pure water of pH 4.5; however, the particles are fixed in a stable manner without being dissociated by stress or the like. By the aforementioned operations, a substrate G2 to which the particles B have been fixed is prepared.

A dispersion solution which is prepared by adding 0.1 g of 1-ethyl-3-[3-(dimethylamino)propyl]carbodiimide hydrochloride (EDC.HCl), while stirring is carried out, to 200 g (pH 5) of an aqueous dispersion solution containing 1.5% by mass of the particles C is uniformly applied on a substrate S2 for fixation and left for about 10 hours for fixation. In the obtained substrate to which the stimulus-responsive polymer gel particles (particle C) have been fixed, the stimulus-responsive polymer gel particles are in a swollen state in pure water of pH7; however, the particles are fixed in a stable manner without being dissociated by stress or the like. By the aforementioned operations, a substrate G3 to which the particles C have been fixed is prepared.

A dispersion solution which is prepared by adding 0.1 g of 1-ethyl-3-[3-(dimethylamino)propyl]carbodiimide hydrochloride (EDC.HCl), while stirring is carried out, to 200 g (pH 5) of an aqueous dispersion solution containing 1.5% by mass of the particles D is uniformly applied on a substrate S2 for fixation and left for about 10 hours for fixation. In the obtained substrate to which the stimulus-responsive polymer gel particles (particle D) have been fixed, the stimulus-responsive polymer gel particles are in a swollen state in pure water of pH7; however, the particles are fixed in a stable manner without being dissociated by stress or the like. By the aforementioned operations, a substrate G4 to which the particles D have been fixed is prepared.

(Preparation of a Light-Controlling Element)

Unless specifically mentioned, the curing properties of curable resins are confirmed by placing a test tube upside down. In particular, a specific amount of a dispersion solution to be used for the preparation of an element is put in a test tube, and after applying a curing means such as ultraviolet radiation, heating, or electron irradiation to the dispersion solution, the test tube is placed upside down. It is then visually observed that the cured product inside does not fall.

Example 1

30 g of an aqueous dispersion solution (solid content: 2.0% by mass) containing the particles A is added to 30 g of an ultraviolet curable resin (trade name: SPP-S-13, manufactured by Toyo Gosei Co., Ltd., diluted with distilled water to have a solid content of 5.0% by mass), and stirred for 3 hours with a wave rotor so as to uniformly disperse the particles A within the ultraviolet curable resin (dispersion solution Z). The viscosity of the dispersion solution Z at 20° C. is 150 m Pa·s. Immediately after the preparation, the dispersion solution Z is applied on a glass substrate (300×300×1 mm) having 500 μm-thick polystyrene beads disposed as a spacer, and an opposing glass substrate is disposed on the dispersion solution so as to prevent the evaporation of the ultraviolet curable resin. The substrates are left for 1 hour to precipitate the particles A. It is confirmed with an optical microscope that the particles A are precipitated on the substrate and arranged in a single particle layer. After preparing a light-controlling cell (C1) in which the ultraviolet-curable resin between the substrates is cured by applying ultraviolet rays (high-pressure mercury vapor lamp, cumulative illumination: 3000 mJ/cm$^2$), the glass substrates on both sides are removed to obtain a light-controlling element (D1). The ultraviolet curable resin is completely cured, with no deformation of the element. In the light-controlling element, the stimulus-responsive polymer gel particles (particles A) are in a swollen state and blackened at room temperature, and when heated to 60° C., the particles A are shrunk and turned totally transparent. The amount of volume change in the particles A is about 15 times.

Example 2

One of the glass substrates is taken out of the light-controlling cell (C1) which is prepared in the same manner as in Example 1 to obtain a light-controlling element (D2). In the light-controlling element, the stimulus-responsive polymer gel particles (particles A) are in a swollen state and blackened at room temperature, and when heated to 60° C., the particles A are shrunk and turned totally transparent. The amount of volume change in the particles A is about 15 times.

Example 3

A light-controlling cell (C1) which is prepared in the same manner as in Example 1 is used as a light-controlling element (D3).
In the light-controlling element (D3), the stimulus-responsive polymer gel particles (particles A) are in a swollen state and blackened at room temperature, and when heated to 60° C., the particles A are shrunk and turned totally transparent. The amount of volume change in the particles A is about 15 times.

Example 4

Adhesive spacers (500 μm) are arranged at intervals of 2 cm on the substrate G1 to which the particles A have been fixed, and another glass substrate of the same size is placed in an opposed position. The periphery of the substrates is sealed with a butyral tape to prepare a light-controlling cell (L1). An ultraviolet curable resin (trade name: SPP-S-13, manufactured by Toyo Gosei Co., Ltd., diluted with distilled water to have a solid content of 5.0% by mass) solution (having a viscosity of 150 mPa·s at 20° C.) is injected into the light-controlling cell (L1). After the light-controlling cell (L1) is irradiated with ultraviolet rays (high-pressure mercury vapor lamp, cumulative illumination: 3000 mJ/cm$^2$) to cure the ultraviolet curable resin inside the light-controlling cell, the glass substrate not having the particles A fixed thereto is removed to obtain a light-controlling element (D4). The ultraviolet curable resin is completely cured to be in a gel state, with no deformation of the element. In the light-controlling element, the stimulus-responsive polymer gel particles (particles A) are in a swollen state and blackened at room temperature, and when heated to 60° C., the particles A are shrunk and turned totally transparent. The amount of volume change in the particles A is about 15 times.

Example 5

Adhesive spacers (500 μm) are arranged at intervals of 2 cm on the substrate G1 to which the particles A have been fixed, and another glass substrate of the same size is placed in an opposed position. The periphery of the substrates is sealed with a butyral tape to prepare a light-controlling cell (L2). A solution of polyvinyl alcohol (trade name: POVAL, manufactured by Shin-Etsu Chemical Co., Ltd., having an average degree of polymerization of 2600, a concentration of 7.5% by mass and a viscosity at 20° C. of 2000 mPa·s) is injected inside the light-controlling cell (L2) so as to prepare a light-controlling element (D5). In the light-controlling element, the stimulus-responsive polymer gel particles (particles A) are in a swollen state and blackened at room temperature, and when heated to 60° C., the particles A are shrunk and turned totally transparent. The amount of volume change in the particles A is about 10 times.

Example 6

Adhesive spacers (500 μm) are arranged at intervals of 2 cm on the substrate G1 to which the particles A have been fixed, and another glass substrate of the same size is placed in an opposed position. The periphery of the substrates is sealed with a butyral tape to prepare a light-controlling cell (L3). 500 ml of an aqueous solution (having a viscosity of 5 mPa·s at 20° C.) containing 25 g of acrylamide, 0.5 g of N,N'-methylenebisacrylamide, and 0.2 g of ammonium persulfate which are dissolved therein is injected into the light-controlling cell (L3). The light-controlling cell (L3) is heated for 10 hours at 60° C. to cure the acrylamide inside by a radical reaction so as to obtain a light-controlling element (D6). In the light-controlling element, the stimulus-responsive polymer gel particles (particles A) are in a swollen state and blackened at room temperature, and when heated to 60° C., the particles A are shrunk and turned totally transparent. The amount of volume change in the particles A is about 12 times.

Example 7

Adhesive spacers (500 μm) are arranged at intervals of 2 cm on the substrate G1 to which the particles A have been fixed, and another glass substrate of the same size is placed in an opposed position. The periphery of the substrates is sealed with a butyral tape to prepare a light-controlling cell (L4). 500 ml of aqueous solution (having a viscosity of 5 mPa·s at 20° C.) containing 25 g of acrylamide and 0.2 g of ammonium persulfate which are dissolved therein is injected into the light-controlling cell (L4). The light-controlling cell (L4) is heated for 10 hours at 50° C. to cure the acrylamide inside by a radical reaction so as to obtain a light-controlling element (D7). Due to the radical reaction, the acrylamide turns into polyacrylamide. In the light-controlling element, the stimulus-responsive polymer gel particles (particles A) are in a swollen state and blackened at room temperature, and when heated to 60° C., the particles A are shrunk and turned totally transparent. Some of the aqueous solution of polyacrylamide inside is taken out and its viscosity is measured and found to be 10,000 mPa·s at 20° C. The amount of volume change in the particles A is about 12 times.

Example 8

Adhesive spacers (500 μm) are arranged at intervals of 2 cm on the substrate G1 to which the particles A have been fixed, and another glass substrate of the same size is placed in an opposed position. The periphery of the substrates is sealed with a butyral tape to prepare a light-controlling cell (L5). An ultraviolet curable resin (trade name: SPP-S-13, manufactured by Toyo Gosei Co., Ltd., diluted with distilled water to have a solid content of 5.0% by mass) solution (having a viscosity of 150 mPa·s at 20° C.) is injected into the light-controlling cell (L5). The light-controlling cell (L5) is irradiated with ultraviolet rays (high-pressure mercury vapor lamp, cumulative illumination: 3000 mJ/cm$^2$) to cure the ultraviolet curable resin inside the light-controlling cell, so as to prepare a light-controlling element (D8). In the light-controlling element, the stimulus-responsive polymer gel particles (particles A) are in a swollen state and blackened at room temperature, and when heated to 60° C., the particles A are shrunk and turned totally transparent. The amount of volume change in the particles A is about 15 times.

Example 9

Adhesive spacers (500 μm) are arranged at intervals of 2 cm on a glass substrate, and an ultraviolet curable resin (trade name: SPP-S-13, manufactured by Toyo Gosei Co., Ltd., 500 ml of a solution containing the resin diluted with distilled water to have a solid content of 5.0% by mass and 14 g of sodium dodecyl sulfate dissolved therein, and having a viscosity of 6800 mPa·s at 20° C.) is applied onto the substrate using a bar coater. The substrate G1 to which the particles A have been fixed is disposed to oppose the glass substrate, and irradiated with ultraviolet rays (high-pressure mercury vapor lamp, cumulative illumination: 3000 mJ/cm$^2$) to cure the ultraviolet curable resin inside the light-controlling cell. The ultraviolet curable resin is cured sufficiently so as not to saggy when the substrates are inclined. The periphery of the substrates is sealed with an adhesive having ultraviolet curing properties so as to prepare a light-controlling cell (D9). In the light-controlling element, the stimulus-responsive polymer gel particles (particles A) are in a swollen state and blackened at room temperature, and when heated to 60° C., the particles A are shrunk and turned totally transparent. The amount of volume change in the particles A is about 10 times.

Example 10

Adhesive spacers (500 μm) are arranged at intervals of 2 cm on the substrate G2 to which the particles B have been fixed, and another glass substrate of the same size is placed in an opposed position. The periphery of the substrates is sealed with a butyral tape to prepare a light-controlling cell (L6). An ultraviolet curable resin (trade name: ACRA207, manufactured by Toyo Gosei Co., Ltd., diluted with a mixture of distilled water and propylene glycol in a volume ratio of 8:2 to have a solid content of 2.0% by mass, and having a viscosity of 16 mPa·s at 20° C.) is injected into the light-controlling cell (L6). The light-controlling cell (L6) is irradiated with ultraviolet rays (high-pressure mercury vapor lamp, cumulative illumination: 3000 mJ/cm$^2$) to cure the ultraviolet curable resin inside the light-controlling cell, so as to prepare a light-controlling element (D10). In the light-controlling element, the stimulus-responsive polymer gel particles (particles B) are in a shrunk state and transparent at room temperature, and when heated to 60° C., the particles B are swollen and turned totally black. The amount of volume change in the particles B is about 12 times.

Example 11

Adhesive spacers (500 μm) are arranged at intervals of 2 cm on the substrate G1 to which the particles A have been fixed, and another glass substrate of the same size is placed in an opposed position. The periphery of the substrates is sealed with a butyral tape to prepare a light-controlling cell (L7). A solution (having a viscosity of 500 mPa·s at 20° C.) formed by dissolving 14 g of sodium dodecyl sulfate into 500 ml of an aqueous solution of polyacrylamide (weight average molecular weight: 100000, solid content: 5.0% by mass) is injected into the light-controlling cell. The light-controlling cell is irradiated with an electron beam which is a kind of radiation so as to cross-link and cure the polyacrylamide inside, thereby preparing a light-controlling element (D11). In the light-controlling element, the stimulus-responsive polymer gel particles (particles A) are in a swollen state and blackened at room temperature, and when heated to 60° C., the particles A are shrunk and turned totally transparent. The amount of volume change in the particles A is about 15 times.

Example 12

Adhesive spacers (300 μm) are arranged at intervals of 1 cm on the substrate G3 to which the particles C have been fixed, and another glass substrate of the same size equipped with ITO electrodes is placed in an opposed position. The periphery of the substrates is sealed with a butyral tape to prepare a light-controlling cell (L8). 3 ml of an ultraviolet curable resin (trade name: SPP-S-13, manufactured by Toyo Gosei Co., Ltd., diluted with distilled water to have a solid content of 5.0% by mass, and having a viscosity of 150 mPa·s at 20° C.) is injected into the light-controlling cell. The light-controlling cell (L8) is irradiated with ultraviolet rays (high-pressure mercury vapor lamp, cumulative illumination: 3000 mJ/cm$^2$) to cure the ultraviolet curable resin inside the light-controlling cell, so as to prepare a light-controlling element (D12). When the electrode on the substrate to which the particles C have been fixed is used as a cathode and a direct-current voltage of 5V is applied across the ITO glass electrodes, the stimulus-responsive polymer gel particles (particles C) are immediately shrunk and decolored. Then, when a voltage which is opposite in polarity to the decoloring reaction is applied, the particles C are swollen again, and the whole light-controlling element is turned black. The amount of volume change in the particles C is about 20 times.

Example 13

Adhesive spacers (300 μm) are arranged at intervals of 1 cm on the substrate G4 to which the particles D have been fixed, and another glass substrate of the same size equipped with ITO electrodes is placed in an opposed position. The periphery of the substrates is sealed with a butyral tape to prepare a light-controlling cell (L9). 3 ml of an ultraviolet curable resin (trade name: SPP-S-13, manufactured by Toyo Gosei Co., Ltd., diluted with distilled water to have a solid content of 5.0% by mass, and having a viscosity of 150 mPa·s at 20° C.) is injected into the light-controlling cell. The light-controlling cell (L9) is irradiated with ultraviolet rays (high-pressure mercury vapor lamp, cumulative illumination: 3000 mJ/cm$^2$) to cure the ultraviolet curable resin inside the light-controlling cell, so as to prepare a light-controlling element (D13). When the electrode on the substrate to which the particles D have been fixed is used as a cathode, and a direct-current voltage of 5V is applied across the ITO glass electrodes, the stimulus-responsive polymer gel particles (particles D) are immediately shrunk and decolored. Then, when a voltage which is opposite in polarity to the decoloring reaction is applied, the particles D are swollen again, and the whole light-controlling element is turned white. This whitening is considered to result from light scattering due to the difference in refraction index between the gel in a swollen state and the holding member around the gel. The amount of volume change in the particles D is about 20 times.

Comparative Example 1

Adhesive spacers (500 μm) are arranged at intervals of 2 cm on the substrate G1 to which the particles A have been fixed, and another glass substrate of the same size is placed in an opposed position. The periphery of the substrates is sealed with a butyral tape to prepare a light-controlling cell (L10). A distilled water-methanol mixture solution (having a viscosity at 20° C. of less than 1.0 mPa·s) is injected inside the light-controlling cell so as to prepare a light-controlling element (D14). It is observed that when the light-controlling cell is placed in the vertical direction, the bottom of the light-controlling element is thickened. The reason for this is considered to be that the low viscosity of the distilled water-methanol mixture solution causes the liquid to move to the bottom of the element. In the light-controlling element, the stimulus-responsive polymer gel particles (particles A) are in a swollen state and blackened at room temperature, and when heated to 60° C., the particles A are shrunk and turned totally transparent.

Comparative Example 2

300 g of a water dispersion solution containing the particles A (solid content: 2.3% by mass) is added to 300 g of an ultraviolet curable resin (trade name: SPP-US-13, manufactured by Toyo Gosei Co., Ltd., diluted with distilled water to have a solid content of 10% by mass and having a viscosity of 13,000 mPa·s at 20° C.), and stirred so as to disperse the particles A into the ultraviolet curable resin (dispersion solution A). Since the ultraviolet curable resin solution has a high viscosity, the particles A in the dispersion solution A can be dispersed homogeneously for 1 day or longer. The dispersion solution A is applied on a glass substrate provided with adhesive spacers of a size of 500 μm by using a bar coater. Furthermore, a glass substrate is disposed in an opposed position, and ultraviolet rays (high-pressure mercury vapor lamp, cumulative illumination: 3000 mJ/cm$^2$) are applied to cure the ultraviolet curable resin between the substrates. The periphery is sealed with an adhesive having ultraviolet curing properties (trade name: R-381I, manufactured by Nippon Kayaku Co., Ltd.) so as to prepare a light-controlling element (D15). In the light-controlling element, the stimulus-responsive polymer gel particles (particles A) are in a swollen state and blackened at room temperature, and when heated to 60° C., the particles A are shrunk and turned totally transparent. The amount of volume change in the particles A is about 4 times.

[Property Evaluations]

Property evaluations are conducted for the following three items: (1) the total light beam transmittance of the light-controlling element at the time of color development and decoloring; (2) the presence or absence of scattering of the internal liquid when the light-controlling element is broken by dropping a 2 kg iron ball from a height of 1.5 m; and (3) transmittance unevenness at the time of color development at the center and the periphery of the light-controlling part of the light-controlling element (a difference of 5% or more in transmittance is regarded as the presence of transmittance unevenness). The results are shown in Table 1.

TABLE 1

| | Transmittance | | Liquid scattering when the element is broken | Transmittance unevenness |
|---|---|---|---|---|
| | Colored | Decolored | | |
| Example 1 | 18% | 78% | Absent | Absent |
| Example 2 | 16% | 75% | Absent | Absent |
| Example 3 | 11% | 72% | Absent | Absent |
| Example 4 | 16% | 74% | Absent | Absent |
| Example 5 | 11% | 78% | Nearly absent | Absent |
| Example 6 | 11% | 78% | Nearly absent | Absent |
| Example 7 | 21% | 73% | Nearly absent | Absent |
| Example 8 | 19% | 68% | Absent | Absent |
| Example 9 | 20% | 68% | Absent | Absent |
| Example 10 | 19% | 69% | Absent | Absent |
| Example 11 | 12% | 66% | Absent | Absent |
| Example 12 | 25% | 70% | Absent | Absent |
| Example 13 | 33% Whitened | 75% | Absent | Absent |
| Comparative example 1 | 15% | 66% | Present | Absent |
| Comparative example 2 | 5% | 15% | Absent | Absent |

These results indicate that the light-controlling element of the invention has a transmittance of 65% or higher in a decolored state, causes no scattering of the internal liquid when the element is broken and has no transmittance unevenness over the entire light-controlling element. On the other hand, in Comparative example 1, although the change in transmittance is as large as that of the invention, there is a safety problem in that scattering of the liquid occurs when the element is broken. In addition, distortion over the whole element is observed. In Comparative example 2, no liquid scattering or distortion due to an area increase is observed; however, the stimulus-responsive polymer gel is multi-layered inside the light-controlling element, making the change in transmittance insufficient. These results indicate that the invention is useful as light-controlling elements such as light-controlling glass, light switches, light shutters, sensors, and displays.

The invention can provide a highly safe light-controlling element with no deformation due to an area increase, with small density unevenness, and with excellent light-controlling properties.

What is claimed is:

1. A light-controlling element comprising a polymer gel composition layer containing:
   a holding member;
   a liquid; and
   a stimulus-responsive polymer gel which is held by the holding member and which changes in volume by absorbing or discharging the liquid due to an external stimulus, wherein:
   the stimulus-responsive polymer gel is arranged in a single layer in the holding member, and
   the holding member is a cured product of a curable resin in a mixture with the liquid.

2. A light-controlling element according to claim 1, wherein the polymer gel composition layer is disposed on a surface of a substrate.

3. A light-controlling element according to claim 2, wherein the stimulus-responsive polymer gel is disposed in contact with the surface of the substrate.

4. A light-controlling element according to claim 3, wherein the stimulus-responsive polymer gel is fixed on the surface of the substrate.

5. A light-controlling element according to claim 1, wherein the polymer gel composition layer is sandwiched between a pair of substrates.

6. A light-controlling element according to claim 5, wherein the stimulus-responsive polymer gel is disposed in contact with the surface of at least one of the substrates.

7. A light-controlling element according to claim 6, wherein the stimulus-responsive polymer gel is fixed on the surface of at least one of the substrates.

8. A light-controlling element according to claim 1 further comprising a stimulus providing member.

9. A light-controlling element according to claim 1, wherein the stimulus-responsive polymer gel contains a light-controlling material.

10. A light-controlling element according to claim 1, wherein the external stimulus is heat.

11. A light-controlling element according to claim 1, wherein the external stimulus is electricity.

12. A light-controlling element according to claim 1, wherein the curable resin is a thermosetting resin.

13. A light-controlling element according to claim 1, wherein the curable resin is a radiation curable resin.

14. A light-controlling element according to claim 1, wherein the curable resin is an ultraviolet curable resin.

15. A light-controlling element according to claim 1, wherein the curable resin is a water soluble polymer compound.

16. A light-controlling element according to claim 5, wherein the holding member is a polymer compound, and the mixture of the polymer compound and the liquid has a viscosity of not less than 1000 m·Pas at 20° C.

17. A method for manufacturing a light-controlling element according to claim 1 at least comprising:
arranging a stimulus-responsive polymer gel on a surface of a temporary support;
forming a holding member by applying a holding member precursor onto the surface of the temporary support on which the stimulus-responsive polymer gel has been arranged, and curing the holding member precursor; and
removing the temporary support.

18. A method for manufacturing a light-controlling element according to claim 1 at least comprising:
arranging a stimulus-responsive polymer gel on a surface of a substrate; and
forming a holding member by applying a holding member precursor onto the surface of the substrate on which the stimulus-responsive polymer gel has been arranged, and curing the holding member precursor.

19. A method for manufacturing a light-controlling element according to claim 1 at least comprising:
fixing a stimulus-responsive polymer gel onto a surface of a substrate;
preparing a cell by disposing the substrate and another substrate so as to face each other with a specific space therebetween in such a manner that the surface of the substrate having the stimulus-responsive polymer gel fixed thereon faces the other substrate, and sealing a periphery of the substrates;
injecting a holding member precursor into the cell; and
forming a holding member by curing the holding member precursor.

20. A method for manufacturing a light-controlling element according to claim 1 at least comprising:
fixing a stimulus-responsive polymer gel onto a surface of a substrate;
applying a holding member precursor onto at least one surface of the substrate;
disposing a pair of substrates so as to face each other in such a manner that the surface of the substrate on which the stimulus-responsive polymer gel has been fixed and the another surface of the substrate on which the holding member precursor has been applied face inward;
forming a holding member by curing the holding member precursor; and
sealing a periphery of the substrates.

21. A light-controlling element according to claim 1, wherein the holding member is a cross-linked polymer.

* * * * *